(12) United States Patent
Kabasawa et al.

(10) Patent No.: US 8,803,976 B2
(45) Date of Patent: Aug. 12, 2014

(54) IMAGE PICKUP APPARATUS

(75) Inventors: Hidetoshi Kabasawa, Saitami (JP);
Minoru Wakabayashi, Tokyo (JP);
Hiroshi Isobe, Kanagawa (JP)

(73) Assignee: Sony Corporation, Tokyo (JP)

( * ) Notice: Subject to any disclaimer, the term of this patent is extended or adjusted under 35 U.S.C. 154(b) by 809 days.

(21) Appl. No.: 13/005,039

(22) Filed: Jan. 12, 2011

(65) Prior Publication Data
US 2011/0181731 A1     Jul. 28, 2011

(30) Foreign Application Priority Data

Jan. 27, 2010 (JP) ................ P2010-016001
Nov. 22, 2010 (JP) ................ P2010-259709

(51) Int. Cl.
*H04N 5/33*     (2006.01)
*H04N 5/353*    (2011.01)

(52) U.S. Cl.
CPC ............. *H04N 5/3532* (2013.01)
USPC ............................................. 348/164

(58) Field of Classification Search
CPC ............. H04N 5/335; H04N 5/3532
USPC ................................. 348/164, 360
See application file for complete search history.

(56) References Cited

U.S. PATENT DOCUMENTS

| | | | | |
|---|---|---|---|---|
| 5,712,685 | A | * | 1/1998 | Dumas ................ 348/360 |
| 6,525,303 | B1 | * | 2/2003 | Gladnick .............. 250/208.1 |
| 7,005,644 | B2 | | 2/2006 | Ishikawa et al. |
| 2009/0021612 | A1 | * | 1/2009 | Hamilton et al. .......... 348/249 |

FOREIGN PATENT DOCUMENTS

JP     2004-317152     11/2004

OTHER PUBLICATIONS

Maini, Raman; Aggarwal, Himanshu; Study and Comparison of Various Image Edge Detectin Techinques; Feb. 28, 2009; International journal of Image Processing; vol. 3, Issue 1.*
State Intellectual Property Office of P.R.C, Notification of the First Office Action issued in connection with P.R.C. Application No. 201110023340.2, dated Feb. 12, 2014. (16 pages).

* cited by examiner

*Primary Examiner* — Jeremaiah C Hallenbeck-Huber
(74) *Attorney, Agent, or Firm* — K&L Gates LLP

(57) ABSTRACT

Disclosed herein is an image pickup apparatus, including: an image pickup element having a plurality of pixels; and a radiation/shielding portion configured to radiate/shield an electromagnetic wave for the image pickup element in such a way that a partial pixel selective radiation state in which the electromagnetic wave is radiated to a part of the pixels in the image pickup element and the electromagnetic wave is shielded for the pixels other than the part of the pixels is obtained in a time division manner while the part of the pixels to each of which the electromagnetic wave is radiated is successively changed.

15 Claims, 27 Drawing Sheets

F I G . 7
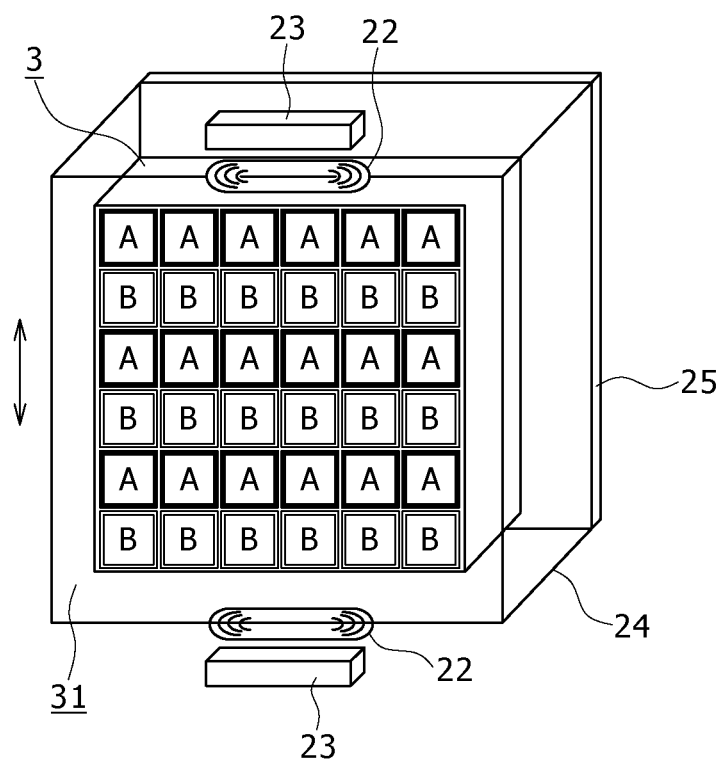

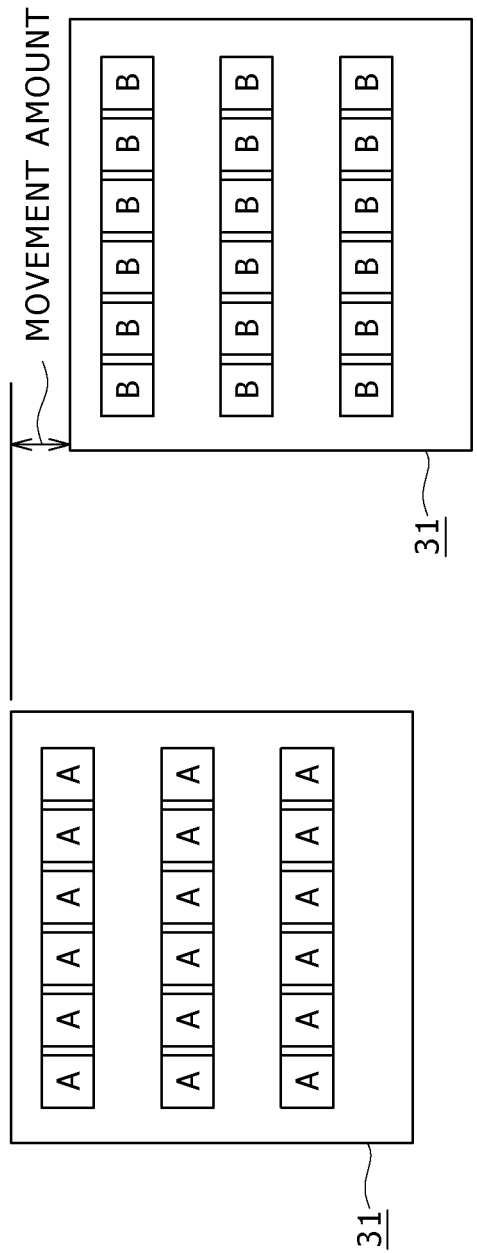

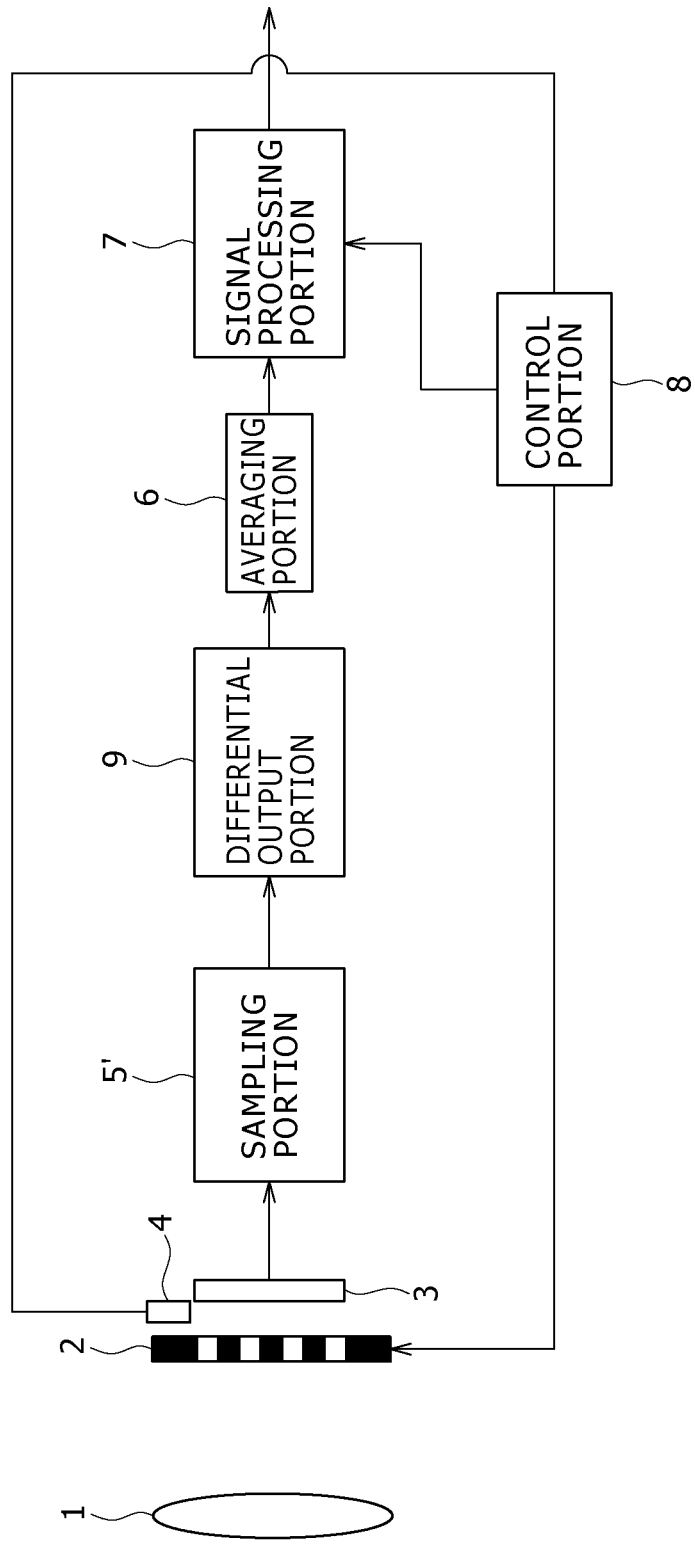

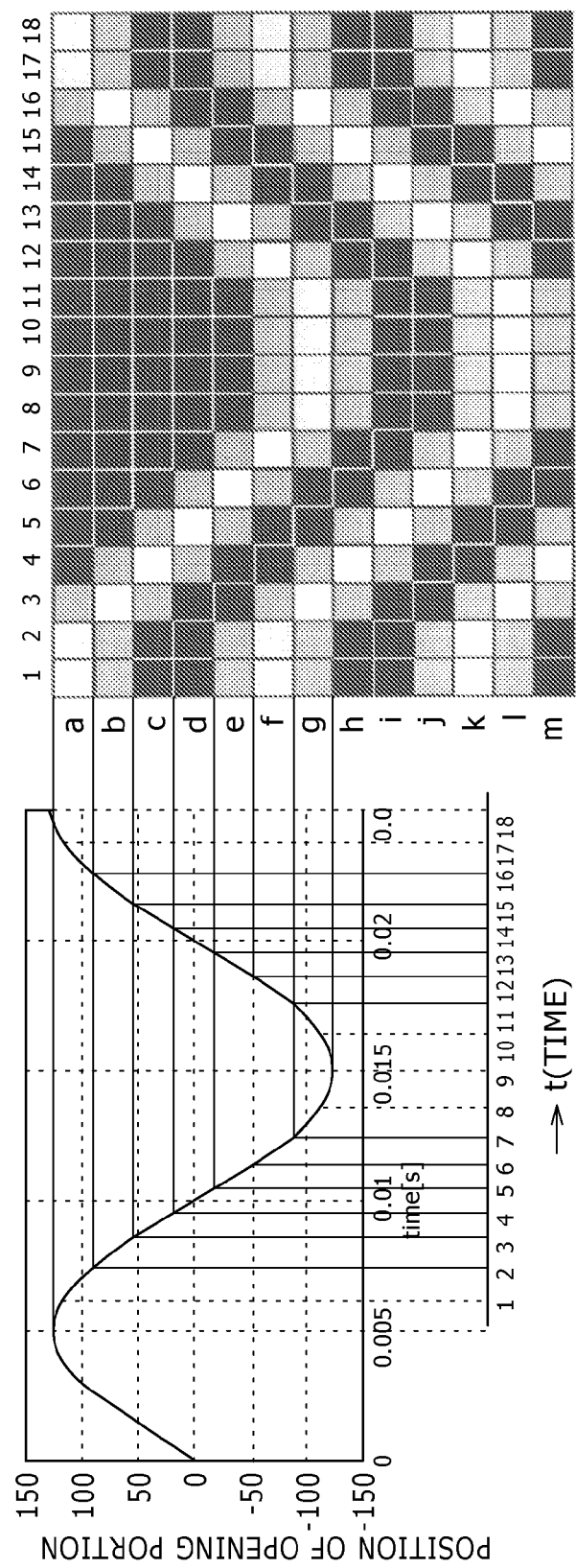

IMAGE PICKUP APPARATUS

CROSS REFERENCES TO RELATED APPLICATIONS

The present application claims priority to Japanese Priority Patent Application JP 2010-259709 filed in the Japan Patent Office on Nov. 22, 2010, and Japanese Priority Patent Application JP 2010-016001 filed in the Japan Patent Office on Jan. 27, 2010, the entire contents of which are hereby incorporated by reference.

BACKGROUND

The present application relates to an image pickup apparatus, and more particularly to an image pickup apparatus which is suitable for obtaining an image from an electromagnetic wave such as an infrared ray.

Heretofore, an infrared image pickup apparatus (such as a thermography) which captures an image of an object by using an infrared sensor composed of pixels each adapted to detect an infrared ray, thereby measuring a temperature of the object as an object whose image is to be captured has been proposed. This infrared image pickup apparatus, for example, is described in Japanese Patent Laid-Open No. 2004-317152.

The infrared image pickup apparatus is composed of a lens and an image pickup element. In this case, very expensive devices are used as these two constituent elements, respectively. A very expensive lens group made of germanium (Ge), zinc sulfide (ZnS), silicon (Si) or the like which has an excellent transmittance in an infrared wavelength region needs to be used as the lens.

For example, a price of one sheet of Ge lens is 10,000 to 50,000 yen. Also, two to five sheets of Ge lenses are used as one set. For this reason, although depending on the necessary resolution, the cost of only the lens group becomes 20,000 to 250,000 yen in total.

Germanium used in the existing Ge lens is a rare metal. Thus, since the flows of germanium in the market are very small, a unit price of the material is as very expensive as 50,000 to 180,000 yen/kg.

It is expected that more inexpensive zinc sulfide (ZnS), for example, is used as an alternate material. However, although ZnS is inexpensive in its unit price of the material, a processing cost is costly because its processing productivity is poor. As a result, the price of the ZnS lens does not change from that of the Ge lens so much.

Although the Si lens is more inexpensive than the Ge lens, the Si lens is unsuitable for being used in the thermography because a transmittance thereof in a far-infrared region (8 to 14 μm) is inferior.

Therefore, the lens which is inexpensive and is not inferior in transmittance without using the rare metal is not currently realized. As has been described, the inexpensive lens is not yet proposed in the image pickup apparatus for the general terahertz wave typified by the far-infrared thermography.

On the other hand, the image pickup element has a hollow structure, called a micro-bolometer, in which pixels each made of a vanadium oxide (VOx) are individually supported in the air.

The reason for requiring the hollow structure is as follows: An S/N ratio of a signal level to a noise level caused by self-heating or the like of a circuit system is poor because of a heated infrared sensor and a low sensitivity of the VOx element. Thus, for heat insulation, the hollow structure is forced to be adopted in the image pickup element.

For this reason, the micro-bolometer is very poor in productivity and thus is a very expensive device.

Vanadium in VOx is a rare metal, the number of manufacturing processes for manufacturing the hollow structure is increased, and thus the manufacturing cost is increased. This causes the micro-bolometer to be expensive.

Under present circumstances, due to the very expensive structure described above, the price in terms of the infrared image pickup apparatus is about 600,000 yen in a low pixel product, and is about 9,000,000 yen in a high pixel product. For this reason, the infrared image pickup apparatus only for business-oriented market is a commercial reality, and thus the infrared image pickup apparatus does not reach an increase in the market in terms of the consumer.

The terahertz wave image pickup apparatus other than the far-infrared thermography also undergoes the same situation as that of the thermography and thus is more expensive than the thermography.

The use application of the current far-infrared thermography is merely limited to industrial equipment temperature management, object temperature detection for defense/security, night vision for night human body detection used for a luxury class car, and medical body temperature detection. Also, the worldwide shipping volume of the far-infrared thermography is 10,000 to 20,000 yen at the most.

In addition, the fact is that the image pickup apparatus for the terahertz wave is hardly produced.

For structuring cheaply the infrared sensor as compared with the image pickup apparatus such as the existing infrared image pickup apparatus (such as the thermography) or the existing teraheltz-wave image pickup apparatus, for example, it is expected to use a charge collecting element. An automatic door, an air conditioner, a human body detecting sensor for detecting that there is a human body in front of a TV, or the like is given as an example in which the charge collecting element is used in the use application of the far-infrared detection.

SUMMARY

However, the infrared sensor, using the charge collecting element, which has been proposed until now has a structure including a single pixel or up to four pixels. Also, the infrared sensor is not such a sensor as to image a subject, and has only a function of detecting whether or not the human body crosses the front of the sensor.

The reason for this is because the charge collecting element cannot detect a statical object because an output signal from the charge collecting element is changed depending on a temperature change.

For this reason, for capturing an image of a subject by using an imager using the charge collecting element, it is necessary to use an optical chopper for repeating release and light blocking for the entire surface of the imager as a chopper function.

For example, as shown in FIG. 27, a circular optical chopper 101 having openings 102 formed therein is disposed as a light blocking member in front of an imager (image pickup element) 103 using a charge collecting element. Also, the optical chopper 101 is rotated with a central axis indicated by a chain line as a rotational axis, whereby a light L is radiated to the imager 103, or is blocked to prevent the light L from being radiated to the imager 103. As a result, an output signal is obtained from the charge collecting element of the imager 103 based on the light L made incident to the imager 103.

However, when this construction is adopted, as apparent from FIG. 27, since the optical chopper 101 itself becomes large in size, and the optical chopper 101 is rotated, a very large space is required for a range of the incident light L for the image capturing.

The present application has been made in order to solve the problems described above, and it is therefore desirable to provide an image pickup apparatus in which a size of a shutter portion necessary for capturing an image of a statical object can be greatly miniaturized as compared with the case of a size of an existing shutter portion, and which can be miniaturized.

In order to attain the desire described above, according to an embodiment, there is provided an image pickup apparatus including: an image pickup element having a plurality of pixels; and a radiation/shielding portion configured to radiate/shield an electromagnetic wave for the image pickup element in such a way that a partial pixel selective radiation state in which the electromagnetic wave is radiated to a part of the pixels in the image pickup element and the electromagnetic wave is shielded for the pixels other than the part of the pixels is obtained in a time division manner while the part of the pixels to each of which the electromagnetic wave is radiated is successively changed.

As described above, in the embodiment, the construction is not adopted such that the radiation/shielding is selected with all the pixels as an object as with the existing optical chopper 101. But, the radiation/shielding of the electromagnetic wave for the image pickup element is carried out in such a way that the partial pixel selective radiation state in which the electromagnetic wave is radiated to only the part of the pixels in the image pickup element is obtained in the time division manner while the part of the pixels are successively changed.

By adopting such a construction, a construction for shielding the electromagnetic wave can be enough as long as the pixels for each of which the electromagnetic wave is shielded can be changed with time. Thus, for example, it is possible to use the shutter section, such as a shielding member (shutter member) or a liquid crystal shutter which is close in size to the image pickup element described above, which is very smaller than the existing optical chopper 101.

As set forth hereinabove, according to the present application, the shutter portion necessary for capturing the image of the statical object can be largely miniaturized as compared with existing one.

As a result, it is possible to miniaturize the image pickup apparatus.

Additional features and advantages are described herein, and will be apparent from the following Detailed Description and the figures.

BRIEF DESCRIPTION OF THE FIGURES

FIGS. 2A and 2B is vertically driven, respectively;

FIG. 7 is a perspective view showing a schematic structure as a second example of the first embodiment of the image pickup apparatus of the present application;

FIGS. 9A and 9B are top plan views showing two states when the shielding member shown in FIG. 7, and FIGS. 8A and 8B is vertically driven, respectively;

FIG. 13 is a block diagram showing a general internal configuration of an image pickup apparatus according to a second embodiment;

FIGS. 21A and 21B are a graph and a view explaining that output differences are generated between pixels in which opening portions are located, respectively, when a driving direction of the shielding member is reversed, and pixels other than these pixels, respectively;

DETAILED DESCRIPTION

Embodiments of the present application will be described below in detail with reference to the drawings.

It is noted that the description will be given below in accordance with the following order.

1. First Embodiment (Simple Reciprocating Motion & Simple Output)
   1-1. First Example (Checker-Like Disposition)
   1-2. Second Example (Stripe-Like Disposition)
   1-3. Third Example (Clear-VID Disposition)
   1-4. Fourth Example (Disposition with Plural Rows as Unit)
2. Second Embodiment (Simple Reciprocating Motion & Differential Output)
3. Third Embodiment (Variable Reciprocating Range: Suppression of Image Blurring in Vicinity of Opening Portion Boundary)
4. Fourth Embodiment (Variable Reciprocating Motion & Suppression of Output Difference in Phase of Driving Direction Reverse)
5. Changes
1. First Embodiment (Simple Reciprocating Motion & Simple Output)
1-1. First Example (Checker-Like Disposition)

Figure 1:
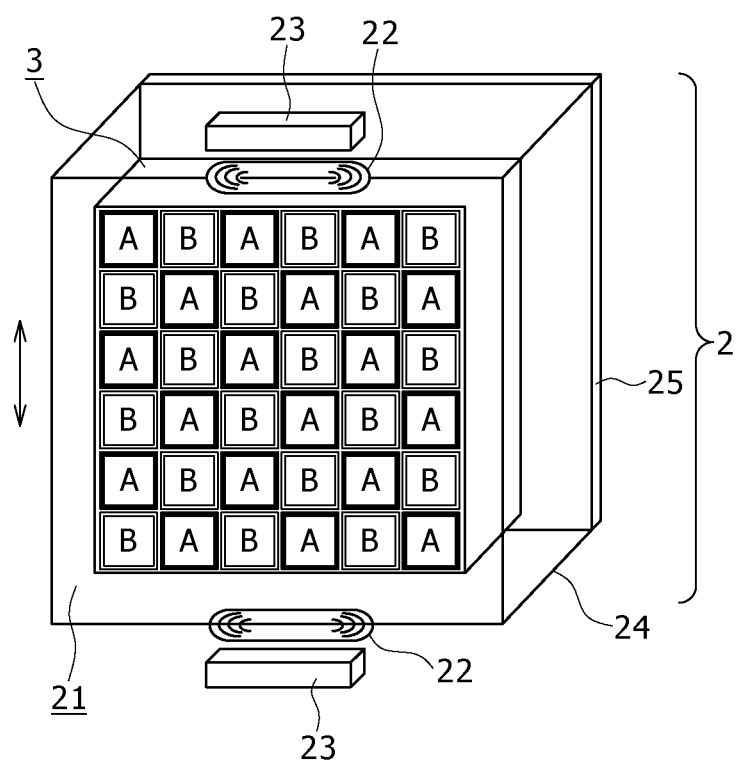
FIG. 1 is a perspective view showing a schematic structure of an image pickup device as a first example of a first embodiment of an image pickup apparatus of the present application.

FIG. 1 is a perspective view showing a schematic structure of an image pickup device as a first example of a first embodiment of an image pickup apparatus of the present application.

Here, in the following description, the case where the present application is applied to an image pickup apparatus in which an infrared ray as an electromagnetic wave is treated as an object of image capturing is exemplified.

As shown in FIG. 1, an image pickup device as the first example of the first embodiment is provided with an imager 3, and a shutter portion 2 as a constituent element for radiation/shielding of the electromagnetic wave for the imager 3. The shutter portion 2 includes a shielding member 21 and constituent elements (such as coils 22 and magnets 23 which will be described later). In this case, opening portions 21A which will be described later and through which the infrared ray is radiated to the imager 3 are formed in the shielding member 21. Also, the constituent elements are used to cause the shielding member 21 to make a reciprocating motion.

Figure 2A:
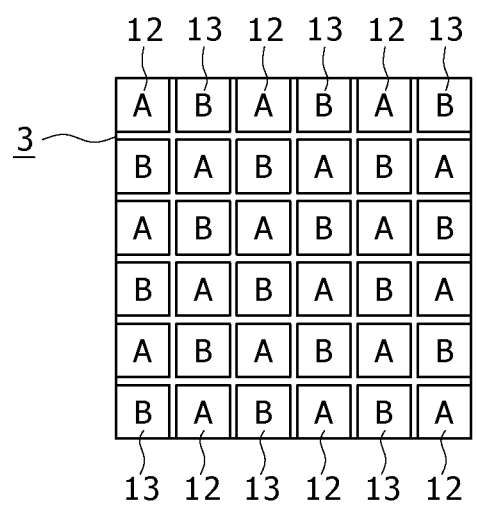
FIGS. 2A and 2B are top plan views showing schematic structures of an imager and a shielding member of the image pickup device as the first example of the first embodiment of the image pickup apparatus shown in FIG. 1, respectively.
Figure 2B:
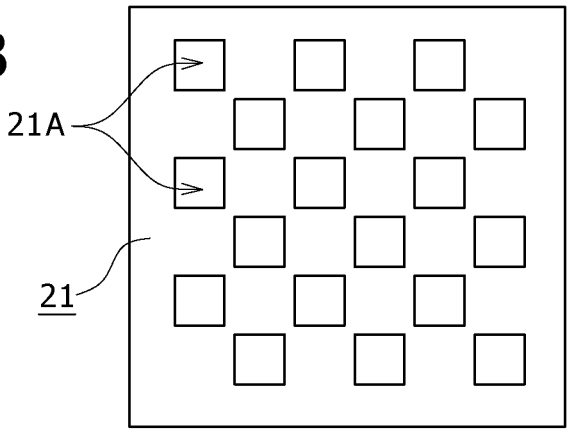

FIGS. 2A and 2B are top plan views showing schematic structures of the imager 3 and the shielding member 21 of the image pickup device shown in FIG. 1.

The imager 3 is composed of an image pickup element using a charge collecting element. Thus, rectangular pixels are disposed in a grid and in a matrix in a plane. In this case, the pixels are classified into pixels 12 belonging to an A group and pixels 13 belonging to a B group. Also, the pixels 12 belonging to the A group (hereinafter referred to as "A pixels 12") and the pixels 13 belonging to the B group (hereinafter referred to as "B pixels 13") are alternately disposed in a checker-like pattern.

Material, having intrinsic polarization, such as lead zirconate titanate (PZT) can be used as a material for the charge collecting element.

Since the electric charges corresponding to a change in intrinsic polarization by incidence of a light is obtained in the charge collecting element, these electric charges are converted into a voltage, thereby obtaining a voltage signal (luminance value).

The shielding member 21 has the opening portions 21A each of which passes the electromagnetic wave, and other portions which are not the opening portions 21A (portions which shield the electromagnetic wave).

In the first example, a size of the opening portion 21A is either approximately the same as that of the pixel of the imager 11, or is slightly smaller than that of the pixel of the imager 11.

In the shielding member 21, the opening portions 21A and the portions which are not the opening portions 21A are alternately disposed in a checker-like pattern.

Referring back to FIG. 1, in the shutter portion 2, the coils 22 are provided so as to be connected to an upper portion and a lower portion of the shielding member 21, respectively. Also, the magnets 23 are disposed so as to face the outsides of the coils 22, respectively.

As a result, by utilizing a magnetic field generated by causing currents to flow through the coils 22, respectively, the shielding member 21 can be vertically driven as shown by a left-hand side double sided arrow in accordance with an operation together with the magnetic fields from the magnets 23. That is to say, a Voice Coil Motor (VCM) is composed of the coils 22 and the magnets 23.

One ends of wire suspensions 24 are connected to four corners of the shielding member 21, respectively, and a plate-like suspension holder 25 is connected to the other ends of the wire suspensions 24.

Of the four wire suspensions 24, at least one wire suspension 24 is a plus electrode, and at least different one wire suspension 24 is a minus electrode. Thus, the current can be caused to flow through the coil 22 through the plus electrode and the minus electrode. As a result, the shielding member 21 can be driven in accordance with the electromagnetic induction for the magnetic fields of the magnets 23 facing the coils 22, respectively.

Figure 3B:
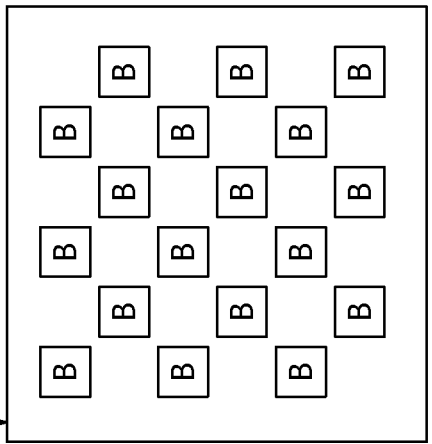
FIGS. 3A and 3B are top plan views showing two states when the shielding member shown in FIG. 1.
Figure 3A:
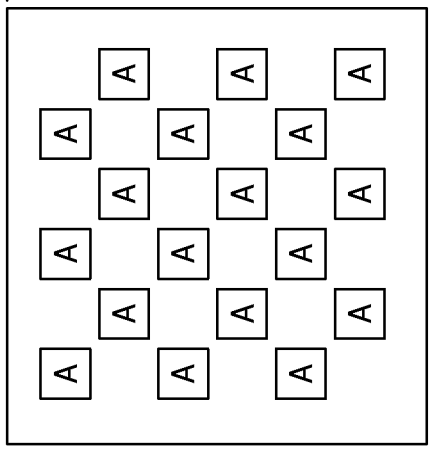

FIGS. 3A and 3B are top plan views showing two states when the shielding member 21 is vertically driven, respectively.

In the first example, the shielding member 21 is vertically reciprocated. As a result, a first state (refer to FIG. 3A), and a second state are repetitively obtained. In this case, in the first state, the A pixels 12 face the opening portions 21A, respectively. Also, in the second state, the B pixels 13 face the opening portions 21A, respectively.

Since in the first state, the electromagnetic wave is made incident to each of the A pixels 12, and the electromagnetic wave is made incident to none of the B pixels 13. On the other hand, since in the second state, the electromagnetic wave is made incident to each of the B pixels 13, and the electromagnetic wave is made incident to none of the A pixels 12.

At this time, a movement amount of shielding member 21 in the transition between the first state and the second state, as apparent from FIG. 3B, corresponds to a size of about one pixel.

As has been described, since the movement amount of shielding member 21 corresponds to the size of about one pixel, a size of the shielding member 21 in the driving direction has only to be at least "a size of the imager 11+the size of one pixel," and thus the image pickup apparatus can be miniaturized.

Giving a description for confirmation, in this case, a space necessary for driving the shielding member 21 also has only to be "the size of the shielding member 21+the size of one pixel (=the size of the imager 11+a size of two pixels)." Thus, in this respect as well, the space can be saved.

Figure 4:
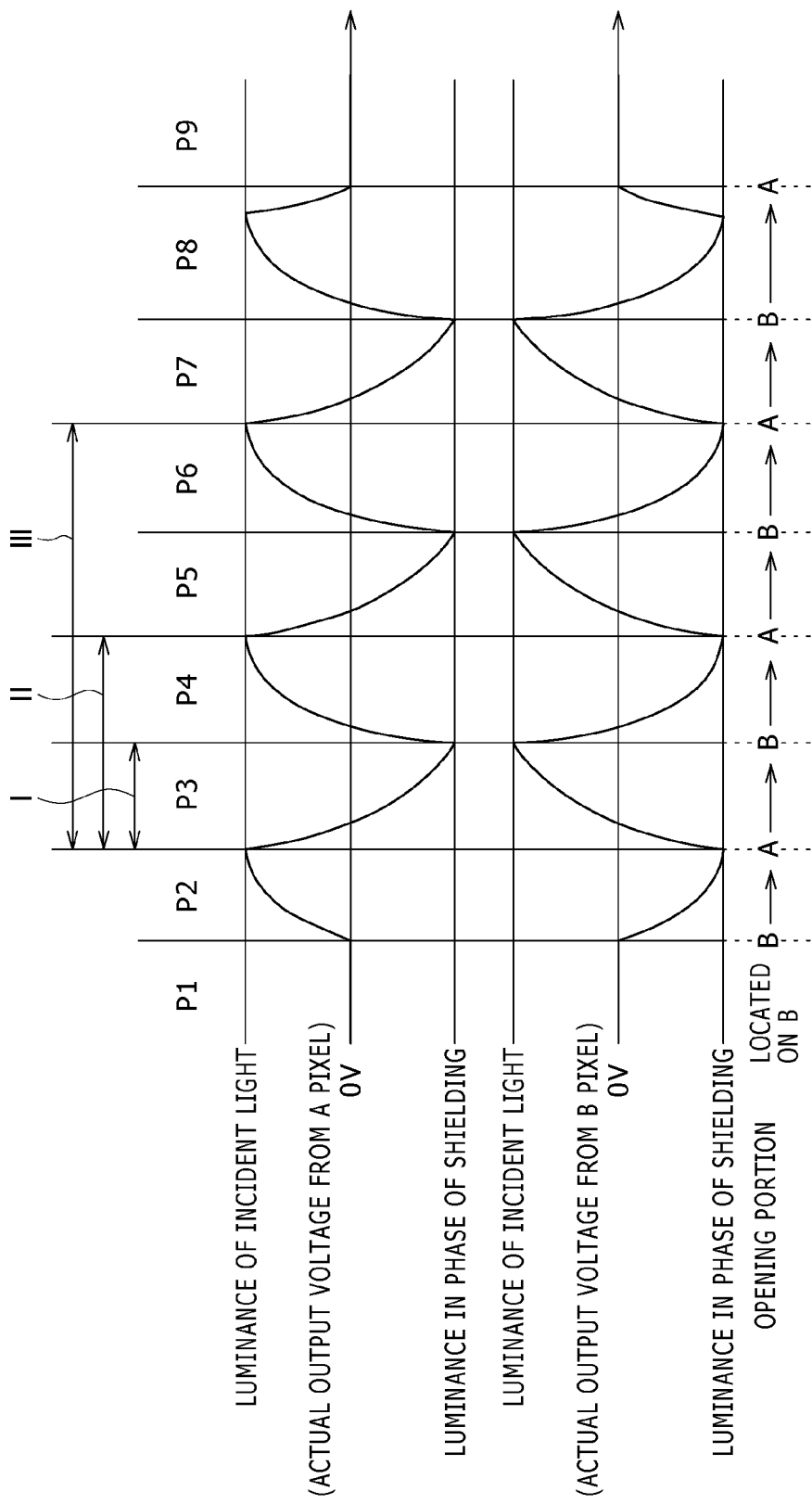
FIG. 4 is a time chart showing waveforms of signals outputted from the pixels of the imager shown in FIG. 1.

Next, FIG. 4 is a time chart showing waveforms of voltage signals outputted from the pixels 12 and 13 of the imager 11, respectively.

An upper portion of FIG. 4 shows an actual output voltage signal from the A pixel 12, and a lower portion of FIG. 4 shows an actual output voltage signal from the B pixel 13. Note that, in FIG. 4, 0 V is a reference voltage.

Hereinafter, the transition of the state will be described.

Firstly, a period, P1, of time is a period of time for which the opening portion 21A is located on the B pixel 13 (in a word, the B pixel 13 is held in a state of radiation of the electromagnetic wave) and the shielding member 21 is statical. In the statical state as the period, P1, of time, the electric charges are not generated unless a subject moves, and 0 V is held after completion of the charge-to-voltage conversion.

For a period, P2, of time, an operation of the shielding member 21 transits from the state of the radiation of the electromagnetic wave to the B pixel 13 to the state of the radiation of the electromagnetic wave to the A pixel 12. As a result, the electromagnetic wave whose intensity gradually increases is radiated to the A pixel 12. Therefore, the output voltage from the A pixel 12 gradually increases from 0 V in a plus direction, and becomes a peak value (positive peak value) at a timing at which the opening portion 21A is perfectly located on the A pixel 12 (at a timing at which the radiation state is perfectly obtained).

On the other hand, the electromagnetic wave whose intensity gradually decreases is radiated to the B pixel 13. Therefore, the output voltage from the B pixel 13 gradually decreases in a minus direction, and becomes a peak value (negative peak value) at a timing at which the electromagnetic wave radiated to the B pixel 13 is perfectly shielded by the shielding member 21.

At this time, the luminance of the incident light to the A pixel 12 corresponds to "the electromagnetic wave from a temperature of the subject—the electromagnetic wave from a temperature of the shielding member 21." In addition, the luminance of the incident light in a phase of the shielding of the electromagnetic wave for the B pixel 13 corresponds to "the electromagnetic wave from the temperature of the shielding member 21—the electromagnetic wave from the temperature of the subject."

It should be noted that with regard to the output voltage in the plus direction from the A pixel 12 or the B pixel 13, and the output voltage in the minus direction from the A pixel 12 or the B pixel 13 as described above, plus and minus are reversed to each other depending on the structure and configuration (the direction of the intrinsic polarization of the charge collecting element, the circuit configuration and the like) of the image pickup apparatus in some cases.

Also, by carrying out the reciprocating motion for the size of one pixel described above, for a next period, P3, of time, the operation of the shielding member 21 transits from the state of the radiation of the electromagnetic wave to the A pixel 12 to the state of the radiation of the electromagnetic wave to the B pixel 13.

As a result, contrary to the case of the period, P2, of time, the output voltage from the A pixel 12 gradually decreases, and becomes a peak value (negative peak value) at a timing at which the electromagnetic wave radiated to the A pixel 12 is perfectly shielded by the shielding member 21. On the other hand, the output voltage from the B pixel 13 gradually increases, and becomes a peak (positive peak value) at a timing at which the B pixel 13 is perfectly held in the state of the radiation of the electromagnetic wave through the opening portion 21A.

Similarly in the following operations as well, for a period, P4, P6, P8, of time for which the A pixel 12 is perfectly held in the state of the radiation of the electromagnetic wave, the output voltage from the A pixel 12 gradually increases and becomes the positive peak value. Also, the output voltage from the B pixel 13 gradually decreases and becomes the negative peak value.

On the other hand, for a period, P5, P7, of time for which the B pixel 13 is perfectly held in the state of the radiation of the electromagnetic wave, the output voltage from the B pixel 13 gradually increases and becomes the positive peak value. Also, the output voltage from the A pixel 12 gradually decreases and becomes the negative peak value.

Note that, FIG. 4 shows a situation in which the period of time for the reciprocating motion of the shielding member 21 is up to the period, P8, of time, and for a period, P9, of time, both the output voltage from the A pixel 12 and the output voltage from the B pixel 13 become 0 V.

In the first example of the first embodiment of the image pickup apparatus, a captured image signal for one frame of the imager 3 (a captured image signal for all the effective pixels) is obtained by using the peak values (the peak values each obtained at the timing at which the perfect radiation state is obtained) of the A pixel 12 and the B pixel 13 based on the reciprocating motion of the shielding member 21.

Specifically, with regard to the output voltages from the A pixel 12 and the B pixel 13 obtained as shown in FIG. 4 so as to follow the reciprocating motion of the shielding member 21, the respective positive peak values are detected, and the captured image signal is obtained by using the positive peak values of the A pixel 12 and the B pixel 13.

At this time, whenever the positive peak value from the A pixel 12, and the positive peak value from the B pixel 13 are obtained, simply, these positive peak values are outputted in order, thereby making it also possible to obtain the captured image signal for one frame. That is to say, a frame rate for the image capturing (a period with which the shielding member 21 is reciprocated once: a period with which a state of a certain pixel transits from the perfect radiation state to the next perfect radiation state), and a frame rate for the output (a period with which the captured image signal for one frame is outputted) are made to agree with each other.

However, the frame rate for the image capturing exerts a large influence on a detection sensitivity of the imager 3 as the charge collecting sensor. Therefore, a relationship of "the frame rate for the image capturing=the frame rate for the output" is difficult to obtain depending on the relationship with the actually set frame rate for the output in some cases.

Figure 5A:
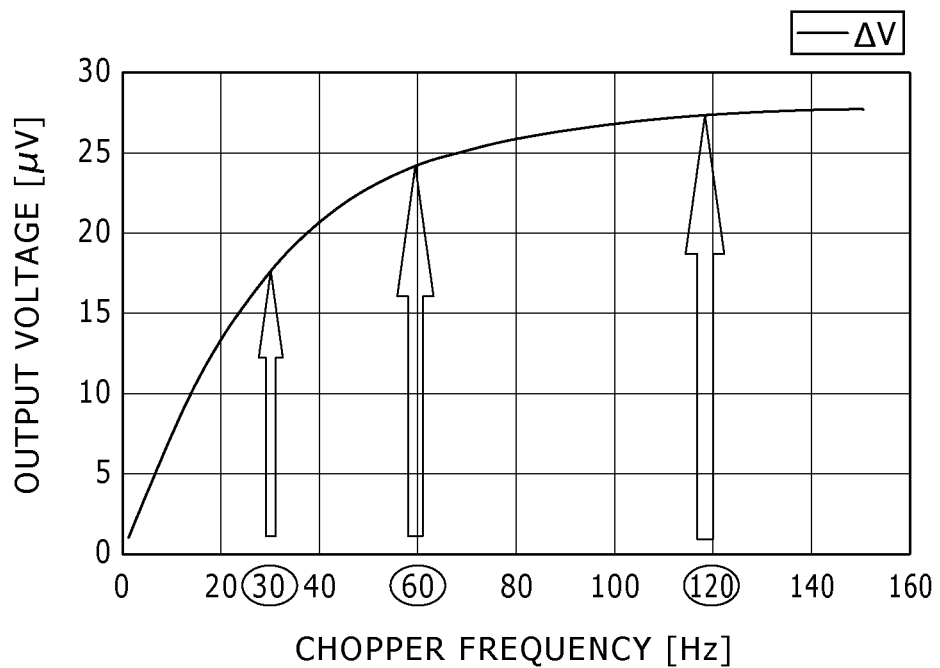
FIGS. 5A and 5B are graphs each representing a relationship between a chopper frequency and an output voltage after completion of charge-to-voltage conversion in a charge collecting element, respectively.
Figure 5B:
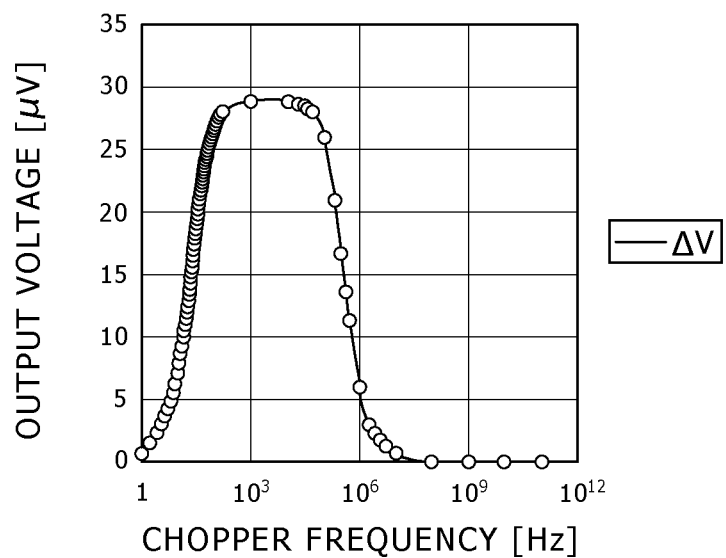

FIGS. 5A and 5B show a relationship between a chopper frequency (a period with which the shielding member 21 is made to one reciprocating motion: the frame rate for the image capturing), and an output voltage from a charge collecting element after completion of the charge-to-voltage conversion.

As shown in FIG. 5A, when the chopper frequency becomes high, the output voltage from the charge collecting element also increases in terms of the characteristics of the charge collecting element. As a result, since the sensitivity of the imager 3 is also enhanced, the further sensitivity is realized.

It is noted that FIG. 5B shows a relationship between the chopper frequency in a wider range than that in the case of FIG. 5A, and the output voltage from the charge collecting element after completion of the charge-to-voltage conversion. However, as can be seen with reference to FIG. 5B, there is a limit to an increase in output voltage due to an increase in chopper frequency. Thus, when a peak of the chopper frequency is passed, the output voltage decreases, and comes to be hardly obtained at the chopper frequency of 108 Hz (=100 MHz) or more. In this case, the large output voltage equal to or larger than 25 μV is obtained up to the chopper frequency of about 104 Hz (=10 kHz).

Here, 30 Hz or 60 Hz, for example, can be given as the general frame rate for the output.

Referring to FIG. 5A, if the frame rate for the output should be set either as 30 Hz or as 60 Hz, when the relationship of "the frame rate for the image capturing=the frame rate for the output" is set as described above, the imager 3 is necessarily used in a relatively lower sensitivity region.

Taking this respect into consideration, the frame rate for the image capturing, for example, is set as the relatively high frequency such as 120 Hz or more. Also, in order to make the frame rate for the image capturing correspond to the general frame rate for the output such as 30 Hz or 60 Hz, it is effective to take some sort of measures.

In the light of this respect, in the first example of the first embodiment of the image pickup apparatus, a technique is adopted such that the frame rate for the output is taken to be F Hz, and the frame rate for the image capturing is taken to be (n×F) Hz (n: an integral number of 2 or more), and in this state, the luminances obtained through the n image capturing manipulations are either integrated or averaged, thereby obtaining the captured image signal for one frame.

For example, under the condition of "the frame rate F for the output=30 Hz," the frame rate for the image capturing is set as 120 (4×F) Hz, and the output voltages from the A pixels 12, and the output voltages from the B pixels 13 which are obtained for four image capturing manipulations are either integrated or averaged. Also, the captured image signal composed of the values from the respective pixels obtained through either the integration or the averaging is outputted as the image signal for one frame.

According to such a technique, the sensitivity of the imager 3 can be highly maintained. In addition thereto, any of the signal noises can be reduced by either the integration or the averaging, and thus an S/N ratio of the captured image signal can be enhanced.

According to the image capturing technique in the first example of the first embodiment described above, the A pixel 12 and the pixel 13 are made to alternately transit to the radiation state, thereby making it possible to intentionally generate the temperature difference. Thus, even when the subject does not move, the temperature distribution of the subject can be captured to obtain the image of the subject. In other words, not only the passing of the subject can be detected, but also the image of the subject can be captured.

In addition, according to the image capturing technique in the first example of the first embodiment, the constituent element composed of the charge collecting element can be used as the imager 3.

As a result, since the imager 3 can be inexpensively structured as compared with the case using the existing microbolometer, the price of the entire image pickup apparatus can be largely reduced.

The price of the entire image pickup apparatus can be largely reduced in such a manner, whereby the image pickup apparatus can be popularized from the existing limited use applications for the study and the industry to the various use applications for the consumer. Also, the application which has not existed heretofore can be realized in the use application for the consumer.

In addition, in the first example of the first embodiment, the opening portions 21A in the shielding member 21, and the portions other than the opening portions 21A are disposed in the checker-like pattern. Thus, the radiation/shielding of the electromagnetic wave for the imager 3 is carried out in such a way that the first state in which the electromagnetic wave is radiated to the A pixel 12, and the second state in which the electromagnetic wave is radiated to the B pixel 13 are obtained in the time division manner.

As a result, the shielding member 21 can be close in size to the imager 3, and the image pickup apparatus can be miniaturized as compared with the case where the existing optical chopper 101 is used.

Here, according to the technique in the first example of the first embodiment as described above, even when the subject is statical, it is possible to obtain the image through the capturing of the temperature distribution of the object. However, the temperature of the subject detected at this time is not the absolute temperature, and thus is absolutely the relative temperature with the temperature of the shielding member 21 as the reference.

In the first example of the first embodiment, the following technique is adopted in order to allow the absolute temperature distribution to be detected as the temperature distribution of the subject.

That is to say, the technique concerned is such that a temperature sensor or a thermistor for detecting the temperature of the shielding member 21 is provided in the vicinity of the shielding member 21, and the relative temperature described above detected by the imager 3 is calibrated based on the data on the temperature.

Figure 6:
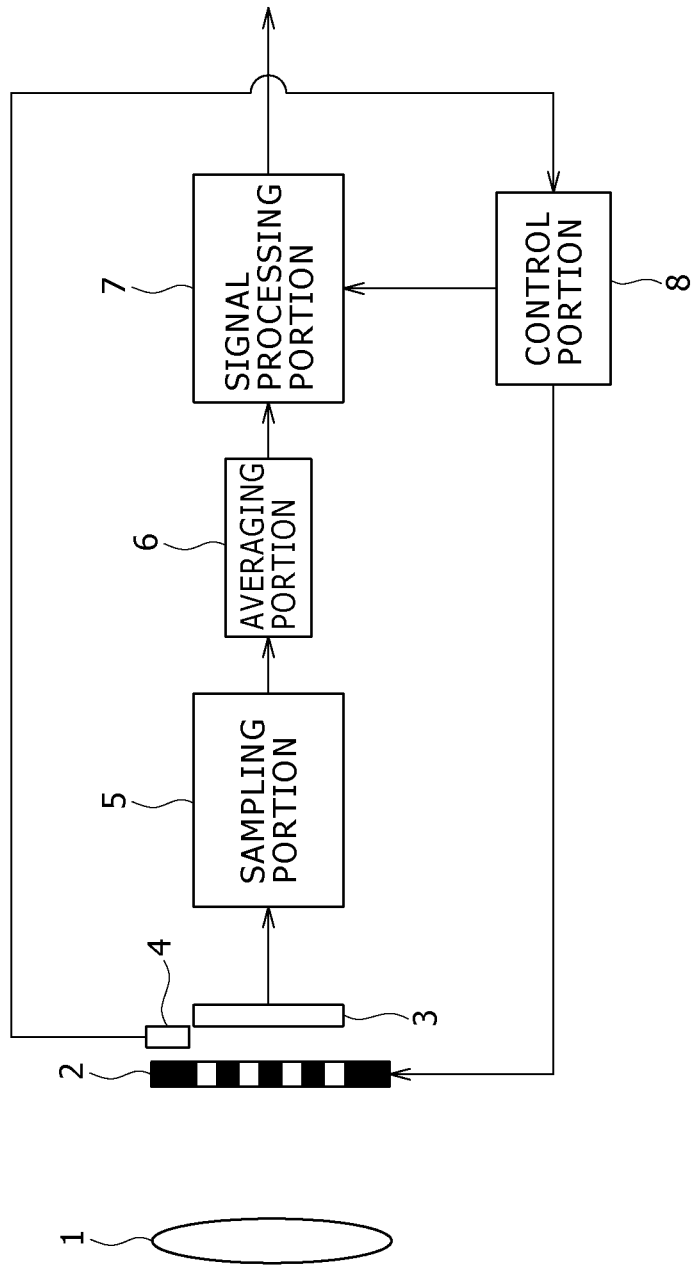
FIG. 6 is a block diagram showing a general internal configuration of the image pickup apparatus according to the first embodiment.

FIG. 6 is a block diagram showing a general internal configuration of the image pickup apparatus for realizing the image capturing technique in the first embodiment described above.

Firstly, an image capturing lens 1 is provided in the image pickup apparatus.

A material for the image capturing lens 1 is especially by no means limited as long as the material transmits the electromagnetic wave as an object.

In this case where the electromagnetic wave as the object is the infrared ray as with the first embodiment, a lens which is made of a more inexpensive material than each of the Ge lens and the Si lens which have been proposed in related art and which can transmit the infrared ray can be used in addition to the Ge lens and the Si lens. In addition, a lens material for the infrared ray which will be developed in future can also be used.

After the electromagnetic wave from the subject is transmitted through the image capturing lens 1, the electromagnetic wave is radiated to the imager 3 through the shutter portion 2 (the opening portions 21A).

Although as shown in FIG. 1, the shutter portion 2 is provided with the shielding member 21, a member made of the material which shields the electromagnetic wave as the object of the image capturing is used as the shielding member 21.

The driving control for the shielding member 21 in the shutter portion 2 is carried out by a control portion 8. Specifically, in the case of the first embodiment, the shutter portion 2 is constructed so as to drive the shielding member 21 by the VCM. Also, the control portion 8 causes the shielding member 21 to carry out the reciprocating motion in accordance with drive signals supplied to the coils 22 (refer to FIG. 1), respectively, in the shutter portion 2.

Specifically, in the case of the first embodiment, a reciprocating range of the shielding member 21 corresponds to the size of one pixel, and a reciprocating period is "n×F (F is the frame rate for the output as also described above)=120 Hz." The control portion 8 supplies the drive signals described above which are set so as to realize the driving for the shielding member 21 based on the reciprocating range and the reciprocating period to the shutter portion 2.

The electric charges obtained from the pixels of the imager 3 so as to follow the reciprocating motion of the shielding member 21 are converted into voltage signals through the charge-to-voltage conversion, and the resulting voltage signals are supplied to the sampling portion 5.

The sampling portion 5 carries out the peak detection (the detection of the positive peak values in the first embodiment) about the voltage signals from the respective pixels and outputs the detected peak values to the averaging portion 6.

The averaging portion 6 averages the peak values from each of the pixels which are inputted thereto from the sampling portion 5 by n times every period of (n×F) Hz. In a word, in the case of the first embodiment, the averaging portion 6 averages the peak values from each of the pixels which are inputted by four times within the period of n×F=4×30=120 Hz.

Also, the values obtained from the respective pixels through such an averaging operation are outputted as the captured image signals for one frame to a signal processing portion 7.

The signal processing portion 7 comprehensively shows a circuit for, for example, carrying out black level correction, pixel defect complementary, aberration correction, optical shading correction, lens distortion correction, temperature adjustment, calculation of an amount of distance change, coding and the like.

An output signal from the signal processing portion 7 is sent to an external display device (image display device) or the like of the image pickup apparatus through an interface (not shown).

In addition, in the case of the first embodiment, the image pickup apparatus is provided with a temperature sensor 4. The temperature sensor 4 is provided in the vicinity of the shielding member 21 in the shutter portion 2 in order to detect a temperature of the shielding member 21.

As shown in FIG. 6, a temperature value detected by the temperature sensor 4 is supplied to the control portion 8.

The control portion 8 carries out the control as well for allowing the image signal representing the absolute temperature distribution to be obtained as the captured image signal based on the temperature value of the shielding member 21 detected by the temperature sensor 4.

Specifically, the temperature value supplied from the temperature sensor 4 is given to the signal processing portion 7, thereby causing the signal processing portion 7 to adjust the values from the respective pixels to the values representing the respective absolute temperatures.

It should be noted that although the configuration with which the values from the respective pixels obtained through n image capturing operations are averaged is exemplified in FIG. 6, of course, a configuration with which the values from the respective pixels obtained through the n image capturing operations are integrated may also be adopted. When the configuration for the integration is adopted, it is possible to effectively realize the noise cancellation using a column ADC for separating a signal and noises from each other or the like.

1-2. Second Example (Stripe-Like Disposition)

Here, in the first example described above, in order to obtain the structure that the A pixels 12 and the B pixels 13 are disposed in the checker-like pattern, with regard to the disposition form of the opening portions 21A in the shielding member 21, the opening portions 21A and the portions other than the opening portions 21A are formed so as to be disposed in the checker-like pattern. However, with regard to the disposition form of the A pixels 12 and the B pixels 13, the A pixels 12 and the B pixels 13 may also be disposed in a stripe-like pattern.

FIG. 7 is a perspective view showing a schematic structure as a second example of the first embodiment of the image pickup apparatus of the present application.

It is noted that in the following description, the portions which have already been described are designated by the same reference numerals, respectively, and a repeated description thereof is omitted here for the sake of simplicity.

As shown in FIG. 7, the shutter portion 2 in the second example of the first embodiment is provided with a shielding member 31 instead of being provided with the shielding member 21 which the shutter portion 2 in the case of the first example includes.

Figure 8A:
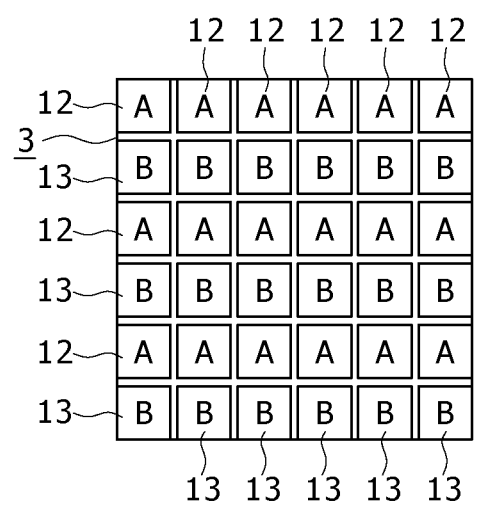
FIGS. 8A and 8B are top plan views showing schematic structures of an imager and a shielding member of the image pickup device as the second example of the first embodiment of the image pickup apparatus shown in FIG. 7, respectively.
Figure 8B:
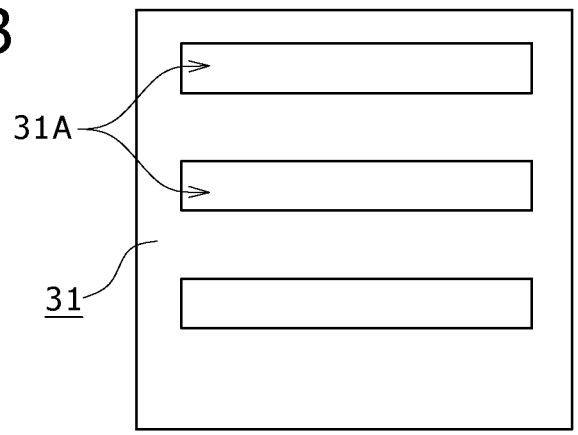

FIGS. 8A and 8B show top plan views showing schematic structures of the imager 3 and the shielding member 31 of the image pickup device shown in FIG. 7.

As shown in FIG. 8B, the shielding member 31 has slit-like opening portions 31A through each of which the electromagnetic wave is passed, and portions other than the opening portions 31A.

A size of the opening portion 31A is set as either being equal to that for one row of the pixel of the imager 3 or being slightly smaller than that for one row of the pixel of the imager 3. Also, in the shielding member 31, as shown in FIG. 8B, the opening portions 31A and the portions other than the opening portions 31A are alternately disposed in a stripe-like pattern every other row.

In the imager 3, the A pixels 12 and the B pixels 13 are alternately disposed in the stripe-like pattern every other row so as to correspond to the shielding member 31.

FIGS. 9A and 9B are top plan views showing two states, respectively, when the shielding member 31 is vertically driven.

In this case as well, the shielding member 31 is vertically driven so as to be reciprocated, whereby a first state (refer to FIG. 9A) in which the A pixels 12 each become a state of radiation of the electromagnetic wave through the opening portions 31A, and a second state (refer to FIG. 9B) in which the B pixels 13 each become the state of radiation of the electromagnetic wave through the opening portions 31A are repeated.

In this case as well, the movement amount of shielding member 31 in the transition between the first state and the second state, as shown in FIGS. 9A and 9B, corresponds to about the size of one pixel. In addition, the space necessary for driving the shielding member 31 has only to be "the size of the shielding member 31+the size of one pixel (=the size of the imager 3+the size of the two pixels)." Therefore, in this example, the image pickup apparatus can be miniaturized as well.

It is noted that since in the second example as well of the first embodiment, other configurations of the circuit portion, the output portion and the like are the same as those in the first example of the first embodiment of the image pickup apparatus, a repeated description based on the illustration is omitted here for the sake of simplicity.

1-3. Third Example (Clear-VID Disposition)

Figure 10A:
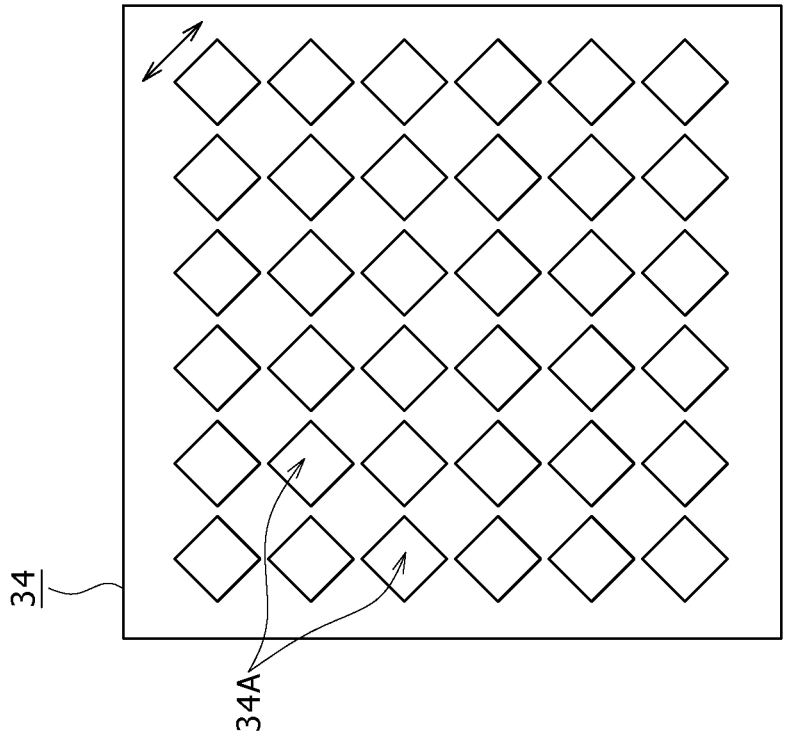
FIGS. 10A and 10B are top plan views showing schematic structures of an imager and a shielding member of an image pickup device as a third example of the first embodiment, respectively.
Figure 10B:
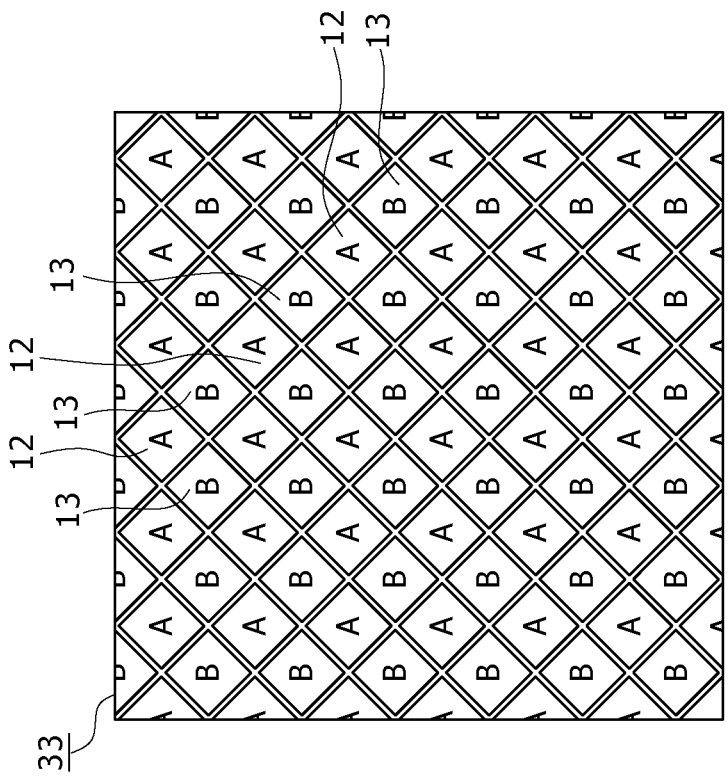

FIGS. 10A and 10B are top plan views showing schematic structures of an imager and a shutter of an image pickup device as a third example of the first embodiment.

FIG. 10A shows a top plan view of an imager 33 which an image pickup device as the third example of the first embodiment includes, and FIG. 10B shows a top plan view of a shielding member 34 which the shutter portion 2 has.

The imager 33 is composed of the image pickup element using the charge collecting element similarly to the case of the imager 3.

As shown in FIG. 10A, in the imager 33, the rectangular pixels are disposed so as to be lined up in an oblique direction. This dispersion is a so-called clear-VID disposition.

In the shielding member 34 shown in FIG. 10B, a size of the opening portion 34A is set either as being equal to the pixel size of the imager 33 or as being slightly smaller than the pixel size of the imager 33. Also, the opening portions 34A and the portions other than the opening portions 34A are alternately disposed in the checker-like pattern.

Therefore, in this case as well, the A pixel 12 and the B pixel 13 are alternately disposed in the checker-like pattern.

In this case, as indicated by a double sided arrow of FIG. 10B, the shielding member 34 is driven in the oblique direction by a movement amount corresponding to about the size of one pixel.

Other structure and configuration are the same as those in the image pickup device of the first example of the first embodiment.

1-4. Fourth Example (Disposition with Plural Rows as Unit)

In addition, the opening portions in the shielding member can be made to correspond not only to one row of the pixels as with the second example of the first embodiment previously stated, but also to a plurality of rows.

Figure 11A:
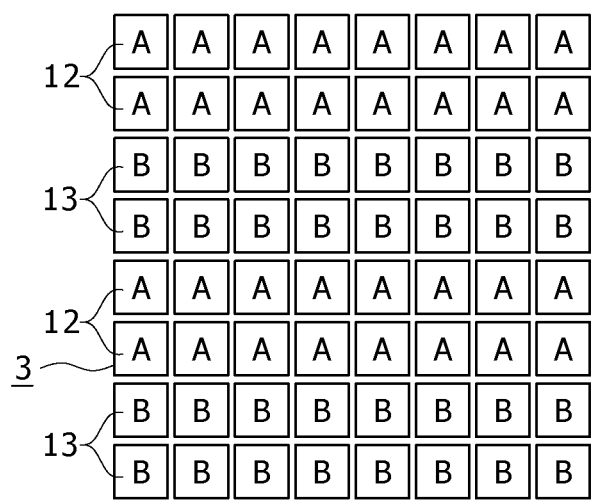
FIGS. 11A and 11B are top plan views showing schematic structures of an imager and a shielding member of an image pickup device as a fourth example of the first embodiment, respectively.
Figure 11B:
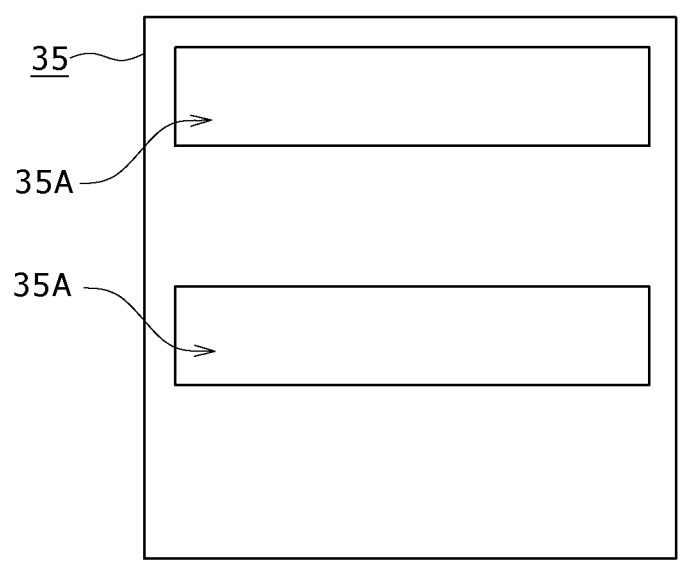

FIGS. 11A and 11B show schematic structural views of an image pickup device as a fourth example of the first embodiment in which the same opening portions of the shielding member are continuously disposed over two or more rows.

FIG. 11A shows a top plan view of the imager 3, and FIG. 11B shows a top plan view which the image pickup device as the fourth example of the first embodiment includes.

Although the imager 3 shown in FIG. 11A is identical to the imager 3 in the case of the first example or the second example, in this case, the A pixels 12 and the B pixels 13 are alternately disposed in the stripe-like pattern with predetermined plural rows as a unit. Specifically, in the fourth example, the stripe-like pattern for two rows of the pixels is obtained in the disposition of the A pixels 12 and the B pixels 13.

In a word, in the shielding member 35 in this case, the opening portions 35A each of which has a size either equal to that for two rows of the pixels of the imager 3, or slightly smaller than that for two rows of the pixels of the imager 3 are formed. Thus, the opening portions 35A and the portions other than the opening portions 35A are alternately disposed with two rows of the pixels as a unit.

In this case, the shielding member 35 is vertically driven by a movement amount corresponding to the size of about two pixels.

Other structure is the same as that of the image pickup device as the first example of the first embodiment.

It is noted that the opening portions 35A of the shielding member 35 can also be formed up to a half of all the pixel rows of the imager 3. In a word, all it takes is that the opening portions 35A and the portions other than the opening portions 35A are alternately disposed at an interval of two or more rows, up to a half of all the pixel rows.

2. Second Embodiment (Simple Reciprocating Motion & Differential Output)

Subsequently, a second embodiment will be described below.

In the second embodiment, there are realized the reduction of the influence exerted on an image pickup apparatus due to the change of the circumferential temperature of the imager 3 following the self-heating of the image pickup apparatus, and the environmental temperature change, and the enhancement of the S/N ratio.

It should be noted that the second embodiment is suitable for the case where the opening portions and the portions other than the opening portions are alternately disposed every other row in the shielding member as with each of the first example, the second example, the third example of the first embodiment, hereinafter, a description will be given by exemplifying the case where the shielding member 21 of the first example of the first embodiment is used.

An image capturing technique in the second embodiment will be described below with reference to FIG. 4.

In this case as well, the driving for the shielding member 21 is the reciprocating motion for the size of one pixel similarly to the case of the first example of the first embodiment. From this, a waveform of the output voltage from the A pixel 12, and a waveform of the output voltage from the B pixel 13 which follow the driving for the shielding member 21 become identical to those shown in FIG. 4, respectively.

In the first embodiment previously stated, the captured image signal for one frame is obtained based on the result of sampling the peak value (positive peak value) of the output voltage from the A pixel 12 obtained in the first state, and the peak value (positive peak value) of the output voltage from the B pixel 13 obtained in the second state. Here, the first state (in which the A pixel 12 side is held in the radiation state, and the B pixel 13 side is held in the shielding state: the periods, P2, P4, P6, P8 of time), and the second state (in which the B pixel 13 side is held in the radiation state, and the A pixel 12 side is held in the shielding state: the periods, P3, P5, P7, of time) are obtained so as to follow the reciprocating motion of the shielding member 21.

On the other hand, in the second embodiment, the peak value of the output voltage from the A pixel 12, and the peak value of the output voltage from the B pixel 13 are detected in both the first state and the second state. Also, a difference between the peak value of the output voltage from the A pixel 12 and the peak value of the output voltage from the B pixel 13 is calculated. Specifically, in the first state, the peak value (positive peak value) of the output voltage from the A pixel 12, and the peak value (negative peak value) of the output voltage from the B pixel 13 are individually detected, and the difference between these peak values thus detected is calculated. In addition, in the second state, the peak value (negative peak value) of the output voltage from the A pixel 12, and the peak value (positive peak value) of the output voltage from the B pixel 13 are individually detected, and the difference between these peak values thus detected is calculated.

Also, the captured image signal for one frame is obtained based on the differential values calculated in the first state and the second state (that is, the differential output voltage between the A pixel 12 and the B pixel 13 calculated in the first state, and the differential output voltage between the A pixel 12 and the B pixel 13 calculated in the second state).

At this time, the calculation for the difference is carried out every pixels located in the positions adjacent to each other. That is to say, the difference between the peak values of the output voltages is calculated between the A pixel 12 and the B pixel 13 adjacent to each other.

Here, as also previously stated, the output voltage (the luminance of the incident light) from the pixel held in the radiation state so as to follow the reciprocating motion of the shielding member 21 corresponds to "the electromagnetic wave from the temperature of the subject—the electromagnetic wave from the temperature of the shielding member 21." In addition, the output voltage (the luminance in the phase of the shielding) from the pixel side held in the shielding state corresponds to "the electromagnetic wave from the temperature of the shielding member 21—the electromagnetic wave from the temperature of the subject."

At this time, the temperature of the shielding member 21 corresponds to the temperature of the circumference of the imager 3 including the environmental temperature and the self-heating.

As can be seen by taking these respects into consideration, in the second embodiment in which the difference between the peak value of the output voltage from the A pixel 12 and the peak value of the output voltage from the B pixel 13 is calculated in the manner as described above, the temperature of the circumference of the imager 3 is usually corrected.

In addition, the difference between the peak value of the output voltage from the A pixel 12 and the peak value of the output voltage from the B pixel 13 is calculated in the manner as described above, whereby the signal level can be approximately doubled, and the S/N ratio can be enhanced. In a word, as a result, the S/N ratio can also be improved.

As has been described, according to the image capturing technique in the second embodiment, it is possible to correct the temperature of the circumference of the imager 3 following the environmental temperature change and the self-heating. In addition, it is possible to suppress the influence (the fluctuation of the output voltage) exerted on the captured image by the environmental temperature change. Also, it is possible to enhance the S/N ratio.

It is noted that in FIG. 4, there is exemplified the case where the timing at which the positive peak value (maximum value) comes in the pixel held in the radiation state, and the timing at which the negative peak value (minimum value) comes in the pixel held in the shielding state are identical to each other. However, when with regard to a time constant of the charge collecting element, a time constant (a time constant in the plus direction) on the side of "the radiation state→the shielding state," and a time constant (a time constant in the minus direction) on the side of "the shielding state→the radiation state" are different from each other, the peak in the plus direction, and the peak in the minus direction are shifted from each other in some cases. In such cases, the setting is made either for the case where the differential output between the peaks at the different times is obtained, or for the case where the differential output at the same time (this case is better either when one of the output voltages is at the peak or at a time between both the peaks) is obtained.

Here, when the subjects whose images the pixels in the positions adjacent to each other capture, respectively, are identical to each other, the influence by the temperature difference exerted on the differential output in the second embodiment described above is small all the more because the temperature difference between the subjects is small. Thus, the correction can be more precisely carried out.

At this time, whether or not the subjects are identical to each other in the pixels in the positions adjacent to each other is associated with the resolution of the image capturing lens system.

Figure 12A:
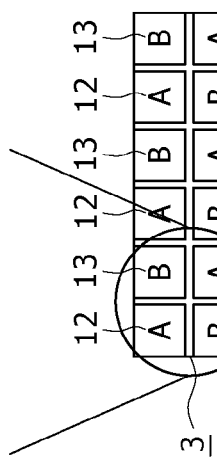
FIGS. 12A, 12B and 12C are views explaining a relationship between a minimum spot diameter of an image capturing lens, and a pixel size in order to make subjects identical to each other in the pixels disposed in adjacent portions, respectively.
Figure 12B:
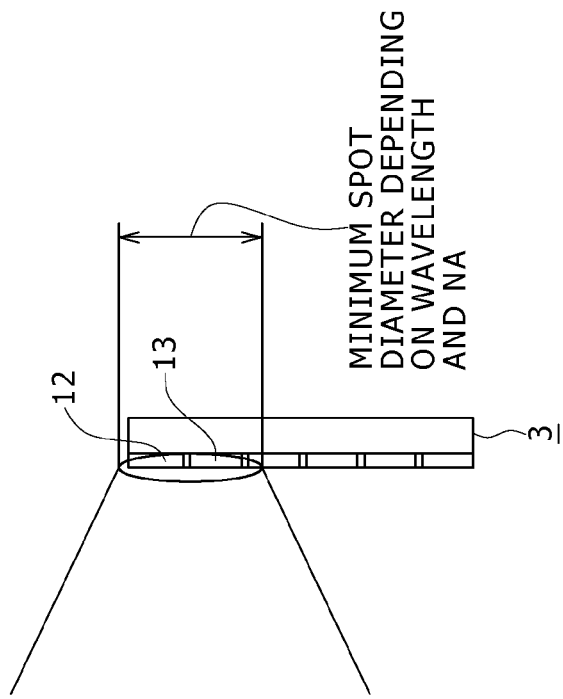
Figure 12C:
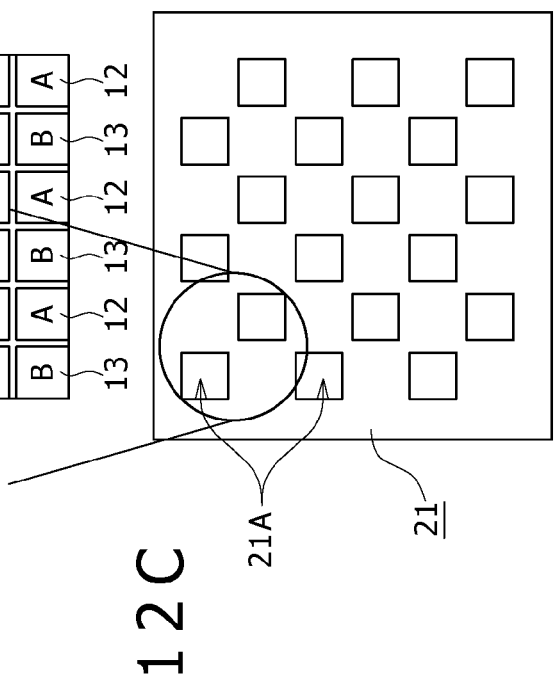

FIGS. 12A, 12B and 12C are views explaining a relationship, between a minimum spot diameter obtained by the image capturing lens 1, and a pixel size, for making the subjects identical to each other in the pixels located in the positions adjacent to each other.

FIG. 12A is a top plan view showing a relationship between the minimum spot diameter obtained by the image capturing lens 1, and the sizes of the pixels in the imager 3, and FIG. 12B is a cross sectional view showing the relationship between the minimum spot diameter obtained by the image capturing lens 1, and the sizes of the pixels in the imager 3. Also, FIG. 12C is a top plan view showing a relationship between the minimum spot diameter obtained by the image capturing lens 1, and a size of the opening portion 21A of the shielding member 21.

Here, the minimum spot diameter ϕ obtained by the image capturing lens 1 is expressed by Expression (1):

$$\phi = 1.22\lambda/NA \qquad (1)$$

where λ is a wavelength of the electromagnetic wave as the object, and NA is a numerical aperture of the image capturing lens 1.

In the second embodiment, the setting of the size of pixels of the imager 3, and the design of the image capturing optical system are carried out in such a way that the four pixels adjacent to one another (the two A pixels 12 and the two B pixels 13 in this case) fall within such a minimum spot diameter.

When the resolution obtained by the image capturing lens 1 is such a resolution as to straddle the four pixels adjacent to one another, it is preferable for this situation to carry out the temperature correction based on the differential output described above because the electromagnetic waves having the same luminance are radiated from approximately the same subject to these four pixels.

Since the pixels located away from one another naturally pick up the temperatures of the different subjects, a slight error is generated when the shielding member 21 is detected with the electromagnetic waves from the different subjects being shielded.

It is noted that although in the second embodiment, the electromagnetic wave to be captured is the infrared ray, even when the electromagnetic wave to be captured is an electromagnetic wave other than the infrared ray, preferably, the correction is carried out (in the form of the differential output) every two pixels adjacent to each other after the setting for the resolution of the image capturing lens 1 as described above has been carried out. The reason for this is because the difference in states (such as the temperature, the brightness, and the color) of the subjects whose images are captured by the two pixels in the positions adjacent to each other is absent (or is very small), and thus the correction can be more precisely carried out.

Now, according to the image capturing technique in the second embodiment described above, with regard to the image representing the temperature distribution of the subject, the image obtained by only the A pixel 12 side, and the image obtained by only the B pixel 13 side are alternately obtained.

At this time, the pixel, held in the radiation state, from which the output voltage representing the temperature of the subject is obtained can be referred to as "a selection pixel" as well. Also, the pixel held in the shielding state can be referred to as "a pixel for correction" as well for correcting the output voltage from the selection pixel.

In terms of such a second embodiment, similarly to the case of the first embodiment, the image on the A pixel 12 side, and the image on the B pixel 13 side can be obtained for one period of the image capturing frame rate (chopper frequency). Therefore, it is possible to establish a relationship of "the image capturing frame rat3=the output frame rate."

However, in this case as well, for the purpose of increasing the sensitivity of the imager 3, similarly to the case of the first embodiment, it is effective to set "the image capturing frame rate=n×F" for "the output frame rate=F."

In the light of this respect, in the second embodiment as well, the technique is adopted such that the frame rate for the output is taken to be F and the frame rate for the image capturing is taken to be n×F, and under this condition, the images on the A pixel 12 side and the images on the B pixel 13 side which are obtained by n times are either integrated or averaged every pixel, and the result obtained through either the averaging or the integration is outputted as one frame image.

Note that, giving a description for confirmation, the image on the A pixel 12 side in this case becomes an image which is obtained by calculating the difference between the peak values of the output voltages from the A pixel 12 and the B pixel 13 adjacent to each other when the A pixel 12 side is held in the radiation state (selection pixel). In addition, the image on the B pixel 13 side becomes an image which is obtained by calculating the difference between the peak values of the output voltages from the B pixel 13 and the A pixel 12 adjacent to each other when the B pixel 13 side is held in the radiation state (selection pixel).

It should be noted that in terms of the second embodiment as well, for the purpose of allowing the absolute temperature distribution of the subject to be obtained, similarly to the case of the first embodiment, either the thermistor or the temperature sensor is provided in the vicinity of the shutter portion 2, and the temperature adjustment (calibration) for the captured image is carried out based on the result of the temperature detection.

FIG. 13 shows a general internal configuration of an image pickup apparatus as the second embodiment for realizing the image capturing technique in the second embodiment described above.

Making the comparison with the image pickup apparatus of the first embodiment shown in FIG. 6, the image pickup apparatus of the second embodiment is different from the image pickup apparatus of the first embodiment described above in that a sampling portion 5' is provided instead of providing the sampling portion 5, and a differential output portion 9 is inserted between the sampling portion 5' and the averaging portion 6.

The sampling portion 5' is configured so as not to detect only the positive peak values of the output voltages from the A pixel 12 and the B pixel 13 as with the case of the first embodiment, but to detect both the positive and negative peak values of the output voltages from the A pixel 12 and the B pixel 13.

The differential output portion 9 calculates a difference between the peak values of the output voltages from the A pixel 12 and the B pixel 13, which are successively supplied thereto from the sampling portion 5', every set of A pixel 12 and B pixel 13 located in the positions adjacent to each other.

Specifically, in the case of the second embodiment, a set of "positive peak value of the output voltage from the A pixel 12 and negative peak value of the output voltage from the B pixel 13," and a set of "positive peak value of the output voltage from the B pixel 13 and negative peak value of the output voltage from the A pixel 12" are alternately supplied to the differential output portion 9 with a period corresponding to ½ of the frame rate for the image capturing.

For a period of time for which "the positive peak value of the output voltage from the A pixel 12, and the negative peak value of the output voltage from the B pixel 13" are supplied to the differential output portion 9, the differential output portion 9 calculates the difference of "the positive peak value of the output voltage from the A pixel 12—the negative peak value of the output voltage from the B pixel 13" every set of A pixel 12 and B pixel 13 located in the positions adjacent to each other, and outputs the calculation result as the image signal on the A pixel 12 side.

In addition, for a period of time for which "the positive peak value of the output voltage from the B pixel 13, and the negative peak value of the output voltage from the A pixel 12" are supplied to the differential output portion 9, the differential output portion 9 calculates the difference of "the positive peak value of the output voltage from the B pixel 13—the negative peak value of the output voltage from the A pixel 12" every set of A pixel 12 and B pixel 13 located in the positions adjacent to each other, and outputs the calculation result as the image signal on the B pixel 13 side.

The image signal on the A pixel 12 side, and the image signal on the B pixel 13 side are inputted from the differential output portion 9 to the averaging portion 6 in this case by n times every one frame period of time on the output side.

The averaging portion 6 averages the values of the image signals on the A pixel 12 side, and the values of the image signals on the B pixel 13 side which are inputted thereto by n times for one frame period of time on the output side in such a manner every pixel. Also, the averaging portion 6 adds the averaged image signals on the A pixel 12 side, and the averaged image signals on the B pixel 13 side to each other, and outputs the resulting signal as the image signal for one frame.

It is noted that since other configurations of the control portion 8, the temperature sensor 4 and the like have already been described, a repeated description thereof is omitted here for the sake of simplicity.

Now, in each of the first and second embodiment which have been described until now, only one of the image on the A pixel 12 side or the image on the B pixel 13 side is obtained with the period of ½ of the image capturing frame rate (a half of the reciprocating period of the shielding member).

Here, if both the image on the A pixel 12 side and the image on the B pixel 13 are desired to be obtained with the period which is ½ of the frame rate for the image capturing, it is effective to carry out the interpolation.

Figure 14:
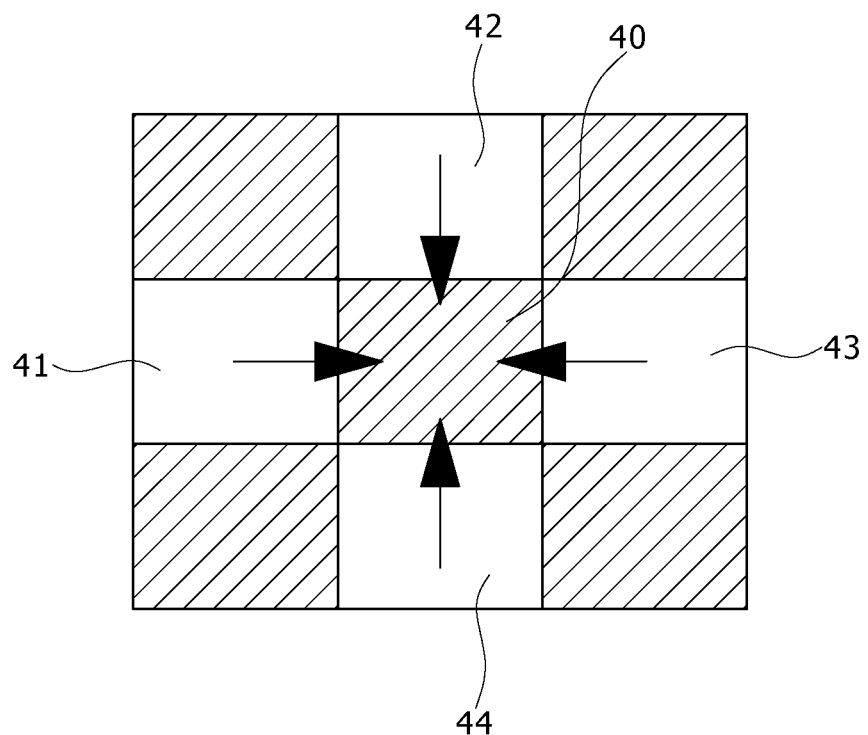
FIG. 14 is a view explaining a technique for complementing a value from the pixel held in a state in which an electromagnetic wave is shielded.

FIG. 14 is a diagram explaining a technique for interpolating a value from the pixel held in the shielding state.

It is noted that in FIG. 14, the case where the shielding member 21 is used as the shielding member of the shutter portion 2 is supposed.

For example, as indicated by four arrows of FIG. 14, a value which is obtained by carrying out medium value interpolation for a pixel (becoming a pixel for correction in the case of the second embodiment) 40 held in the shielding state based on the information obtained from the four pixels 41, 43, 42, and 44, each held in the radiation state, which are disposed adjacent to each other on the left, right, top, and bottom sides, respectively, is outputted as a luminance of the pixel 40.

As a result, for example, the image on the B pixel 13 side can be obtained even in the first state in which only the A pixel 12 is held in the radiation state.

It is noted that since the shielding member 21 having the checker-like pattern of the first example of the first embodiment is supposed in FIG. 14, the four pixels which are disposed on the left, right, top, and the bottom of the pixel for correction are utilized as the selection pixels. The positional relationship between the pixel 40 held in the shielding state, and the circumferential pixels each held in the radiation state and used for the interpolation is different from that shown in FIG. 14 depending on the opening portion formation pattern of the shielding member.

For example, in the case of the shielding member 31 having the stripe-like pattern in the second example of the first embodiment, the six pixels in total of the pixel 42 disposed right above the pixel 40, the two pixels disposed obliquely upward, the pixel 44 disposed right below the pixel 40, and the two pixels disposed obliquely downward can be utilized as the medium value interpolation.

3. Third Embodiment (Variable Reciprocating Range: Suppression of Image Blurring in Vicinity of Opening Portion Boundary)

In the third embodiment, the image blurring is suppressed which is generated in the vicinities of the boundaries between the opening portions and portions other than the opening portions of the shielding member due to a gap defined between the image pickup element and the shielding portion.

Figure 15A:
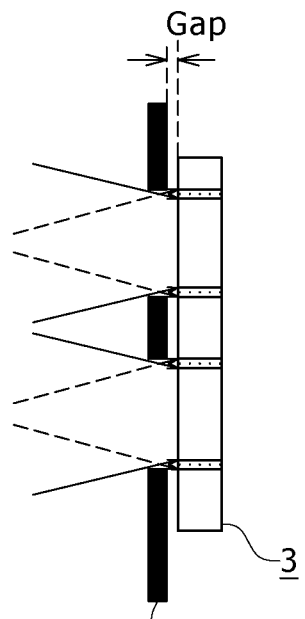
FIGS. 15A and 15B are views explaining a relationship between a gap defined between an image pickup element and a shielding member, and an image blurring region, respectively.
Figure 15B:
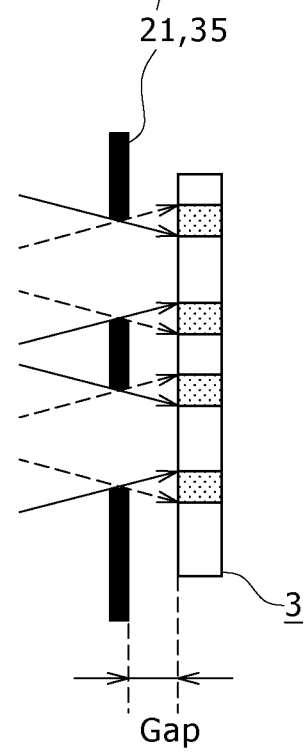

FIGS. 15A and 15B are views explaining a relationship between the gap Gap defined between the image pickup element and the shielding member, and an image blurring region.

FIG. 15A shows a region of the image blurring generated when the gap defined between the imager 3 as the image pickup element and the shielding member 21 or 35 is small. Also, FIG. 15B shows a region of the image blurring generated when the gap defined between the imager 3 and the shielding member 21 or 35 is large.

It should be noted that as apparent from FIGS. 15A and 15B, the gap Gap means an interval between the shielding member 21 or 35 and the imager 3 in a direction parallel with an incidence axis of the electromagnetic wave.

As has been described until now, when the technique for obtaining the captured image by reciprocating the shielding member having the opening portions is adopted, a region to which the electromagnetic wave ought to be radiated if the shielding portion is essentially absent, or to which the electromagnetic wave ought not to be radiated if the opening portion is essentially absent is formed in each of the regions closest to the boundary portions between the opening portions and the portions other than the opening portions of the shielding member (hereinafter referred to as "edge portions of the opening portions" as well), at a timing at which the shielding member reaches either an upper limit portion thereof or a lower limit portion thereof (at a timing at which the driving direction of the shielding member is reserved), of the region on the imager 3. Such regions become the image blurring regions.

It is noted that in other words, the image blurring region is a region in which the contrast of the quantity of light is low.

As can be seen with reference to FIGS. 15A and 15B, such a blurring region on the imager 3 becomes small as the gap defined between the shielding member 21 or 35 and the imager 3 becomes smaller. Conversely, such a blurring region on the imager 3 becomes large as the gap defined between the shielding member 21 or 35 and the imager 3 becomes larger.

For example, when the gap is large, the image blurring is generated over the region for the two pixels located closest to the edge portion of the opening portion (the two pixels in total of the pixel closest to the upper side, and the pixel closest to the lower side) in some cases.

Note that, in the case where the opening portions are formed in the shielding member at the interval of one pixel as with each of the first to third examples of the first embodiment, when the gap is large, there is the possibility that all the pixels correspond to the image blurring regions, respectively.

As can be seen from this respect as well, when any of the first to third examples of the first embodiment is used (when the shielding member is reciprocated by the size of one pixel), preferably, the gap is made small as much as possible.

However, since the shielding member is a movable portion, the mechanically high precision is required for making the gap small, which could increase the manufacturing cost of the image pickup apparatus.

In order to cope with this situation, in the third embodiment, the driving form for the shielding member, and the reading-out timing for the pixels are devised, thereby making it possible to obtain the captured image signal in which the image blurring is suppressed even when the gap is made large.

Figures 16A, 16B:
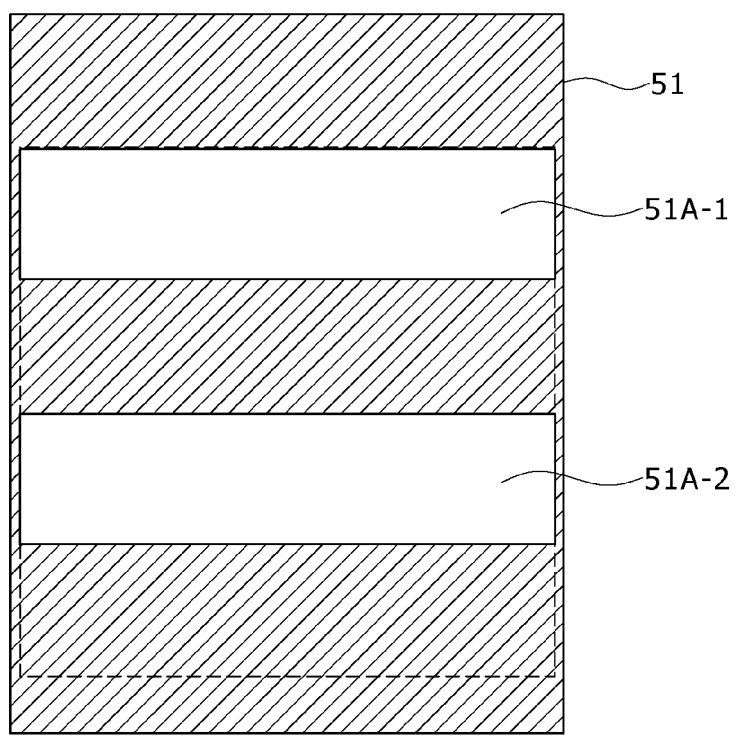
FIGS. 16A and 16B are top plan views showing schematic structures of an imager and a shielding member which an image pickup apparatus according to a third embodiment includes, respectively.

FIGS. 16A and 16B are top plan views showing the imager 3 and a shielding member 51 which an image pickup device in the third embodiment includes, respectively.

Firstly, as shown in FIG. 16A, it is supposed that 144 (=12×12) pixels are formed in the imager 3 for the sake of convenience of the description in this case.

Also, with regard to the shielding member 51 which the shutter portion 2 in this case includes, opening portions 51A each having a width for three rows of the pixels are formed in two portions, respectively, through a portion which is not the opening portion 51A which also has a width for three rows of the pixels. As shown in FIG. 16B, the opening portion 51A which is formed on the upper side is taken to be an opening portion 51A-1, and the opening portion 51A which is formed on the lower side is taken to be an opening portion 51A-2.

Here, FIG. 16A shows the A pixels 12 and the B pixels 13 corresponding to the case where the shielding member 51 simply makes the reciprocating motion for the three pixels. As shown in FIG. 16A, the A pixels 12 and the B pixels 13 in this case can be grasped as being alternately in the stripe-like pattern every three rows.

Note that, giving a description for confirmation, when the shielding member 51 is formed so as to correspond to the reciprocating motion for the three pixels as described above, with regard to a shielding region in the shielding member 51, the shielding region on the upper side of the opening portion 51A-1 needs to be formed so as to have a width for at least three or more pixels, and the shielding region on the lower side of the opening portion 51A-2 also needs to be formed so as to have a width for at least three or more pixels.

However, as will be described later, since in the third embodiment, the shielding member 51 is driven for up to the four pixels both in the upward direction and in the downward direction, each of the shielding region on the upper side of the opening portion 51A-1, and the shielding region on the lower side of the opening portion 51A-2 is provided to have a width for the four or more pixels so as to follow the driving for the reciprocating motion.

Note that, as can be seen from this respect as well, the size of the shielding member can be made dramatically smaller than that of the existing optical chopper 101, and the driving range is so small as to have a range for up to four pixels. Therefore, in the third embodiment as well, the image pickup apparatus can be miniaturized similarly to the case of each of the first and second embodiments described above.

Figure 17:
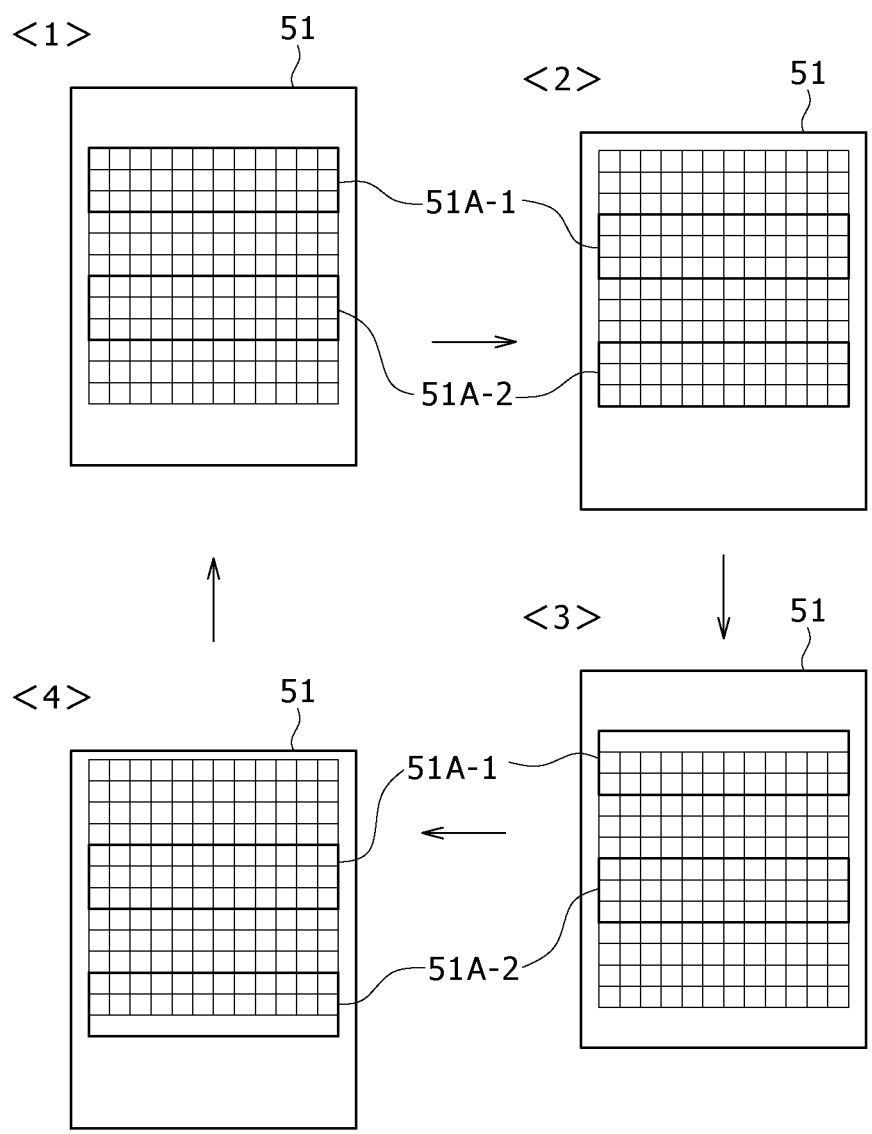
FIG. 17 is a view explaining a technique for driving a shielding member in the image pickup apparatus according to the third embodiment, respectively.

FIG. 17 is a view explaining a technique for driving the shielding member in the third embodiment.

Firstly, in a state <1> shown in FIG. 17, the shielding member 51 is set in a state in which an upper end of the upper-side opening portion 51A-1 agrees with an upper end of the imager 3 (an upper end of an effective pixel range).

Firstly, the shielding member 51 is downward driven from the state <1> by a movement amount for the three pixels to be set in a state <2> shown in FIG. 17. In the state <2>, a lower end of the lower-side opening portion 51A-2 of the shielding member 51 agrees with a lower end of the imager 3 (a lower end of the effective pixel range).

Also, in the third embodiment, when the driving direction is reversed from the state <2> to upward drive the shielding member 51, a movement amount for the four pixels is set to obtain a state <3> in FIG. 17. In the state <3>, the upper end of the upper-side opening portion 51A-1 is located above the upper end of the imager 3 by an amount for the one pixel.

In addition, even when the driving direction is reversed from the state <3> to downward drive the shielding member 51, a movement amount for the four pixels is also set to obtain a state <4> in FIG. 17. In the state <4>, the lower end of the lower-side opening portion 51A-2 is located below the lower end of the imager 3 by an amount for the one pixel.

After the state <4> is obtained, the state is returned back to the state <1> as shown in FIG. 17. That is to say, the shielding member 51 is upward driven by a movement amount for four pixels.

Thereafter, the shielding member 51 is driven in such a way that the state of <1>→<2>→<3>→<4>→<1> . . . is repetitively obtained.

Figure 18:
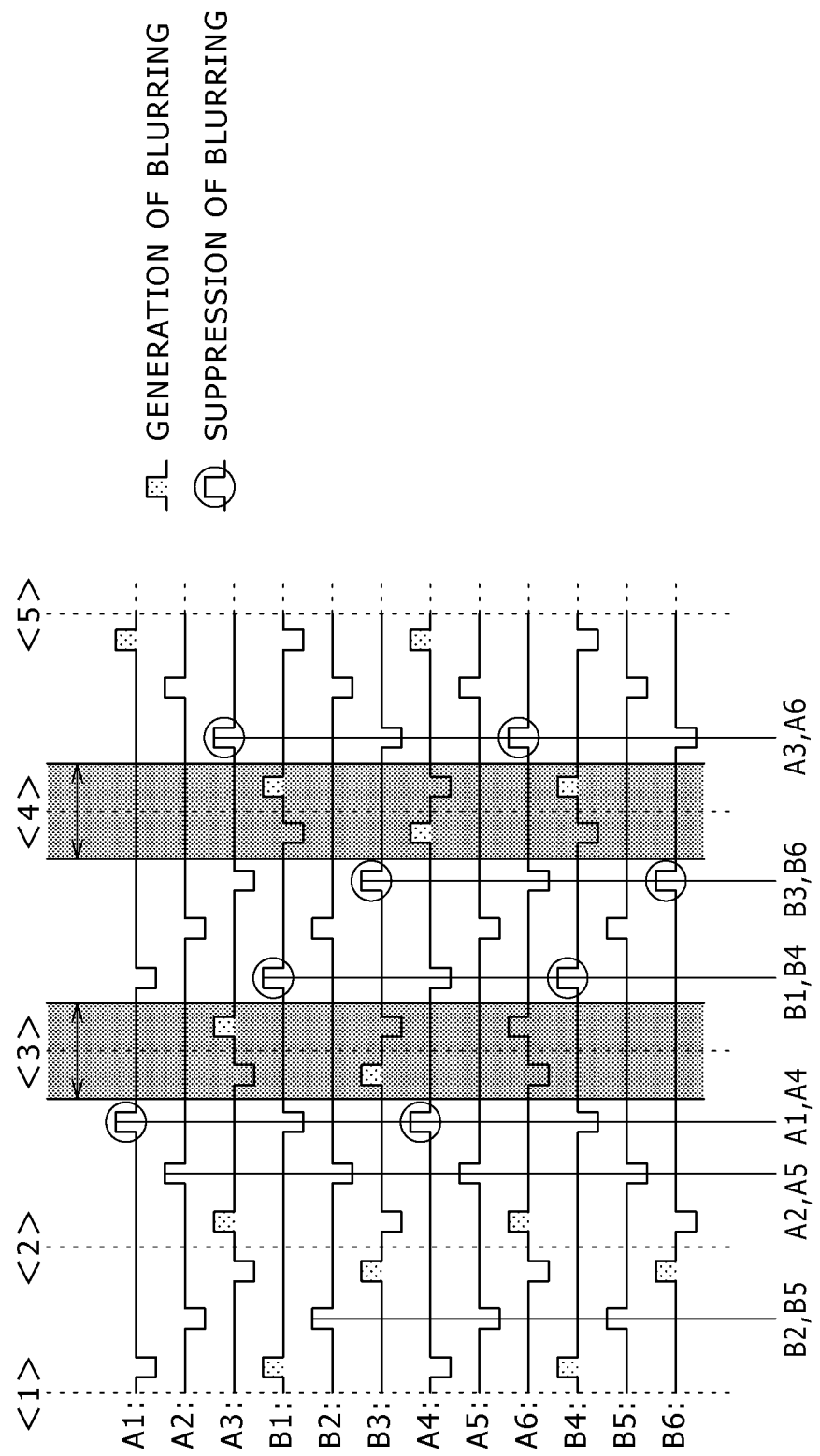
FIG. 18 is a time chart explaining a reading technique for an imager in the image pickup apparatus according to the third embodiment.

FIG. 18 is a time chart explaining a reading-out technique for the imager 3 in the third embodiment.

In FIG. 18, the A pixels 12 and the B pixels 13 which are disposed in the imager 3 are designated by A1, A2, A3, A4, A5, A6, B1, B2, B3, B4, B5, and B6, respectively, in order from the upper side. Thus, FIG. 18 schematically shows the output voltages obtained so as to follow that the driving operation shown in FIG. 17 is carried out in the A1, A2, A3, A4, A5, A6 pixels, and the B1, B2, B3, B4, B5, B6 pixels. Here, an upward convex portion in FIG. 18 means the positive peak value, and a downward convex portion means the negative peak value.

In addition, the convex portion patterned (shaded) means a portion in which the image blurring is generated, and the convex portion marked with a circle means a portion in which the image blurring is suppressed in accordance with the technique in the third embodiment.

Firstly, since a transition period of time of <1>→<2> is a simple driving period of time for the three pixels, the image blurring is generated in each of the B1, B3, and B4, B6 pixels of the B pixels 13 becoming the pixels on the side transiting to the radiation state within this period of time.

Note that, giving a description for confirmation, the region in which the image blurring is generated is a region closest to the edge portion of the opening portion 51A at the timing at which the shielding member 51 reaches either the upper limit position thereof or the lower limit position thereof (at the timing at which the driving direction for the shielding member is reversed). Therefore, the pixels in each of which the image blurring may be generated for the period of time for which the shielding member 51 is downward driven (for the period of time for which the B pixel 13 side transits to the radiation state) as with the period of time for the transition of <1>→<2> are the four pixels, i.e., the B1, B3, B4, and B6 pixels. Contrary to this, the pixels in each of which the image blurring is generated for the period of time for which the shielding member 51 is upward driven (for the period of time for which the A pixel 12 side transits to the radiation state) are the four pixels, i.e., the A1, A3, A4, and A6 pixels.

Here, for the period of time for the transition of <1>→<2>, the output voltage free from the generation of the blurring is obtained in each of the B2 and B5 pixels, which are not closest to the edge portion of the opening portion 51A, of the B pixels 13. Therefore, with respect to the pixels corresponding to the B2 and B5 pixels (i.e., the pixels belonging to the row of B2, and the pixels belonging to the row of B5), the peak values (positive peaks) detected within the period of time for the transition of <1>→<2> are sampled as the effective value of the luminances.

Subsequently, the period of time for the transition of <2>→<3> is a period of time for which the shielding member 51 is upward overrun by an amount for one pixel. For this reason, the image blurring is suppressed in the A1 and A4 pixels, which are located on the overrunning side of the opening portion 51A, of the A1, A3, A4, and A6 pixels in each of which the image blurring may be generated for this period of time.

Therefore, the peak values of the output voltages from the A1 and A4 pixels which are detected for the period of time for the transition of <2>→<3> are sampled as the effective values of the luminances of the A1 and A4 pixels.

In addition, since the peak values of the output voltages from the A2 and A5 pixels are detected for this period of time, these peak values are also sampled.

In addition, the period of time for the transition of <3>→<4> is a period of time for which the shielding member 51 is downward overrun by an amount for one pixel.

Here, in the state <3>, the upper end of the upper-side opening portion 51A-1 of the shielding member 51 is located above the upper end of the A1 pixels by an amount for one pixel, and the upper end of the lower-side opening portion 51A-2 is located in the upper end of the B3 pixels. Therefore, the image blurring is suppressed in the B1 pixels and the B4 pixels in each of which the image blurring may be generated for the period of time for the transition of <3>→<4>. In addition, since for this period of time, as described above, the shielding member 51 is downward overrun, the image blurring is also suppressed in the B3 pixels and the B6 pixels.

Therefore, for the period of time for the transition of <3>→<4>, the peak values of the output voltages from B1, B3, B4, and B6 pixels are sampled as the effective values of the luminances, respectively.

In addition, the period of time for the transition of <4>→<1> is a period of time for which the shielding member 51 is upward driven by a movement amount for four pixels.

In the state <4>, the lower end of the upper-side opening portion 51A-1 of the shielding member 51 is located in the lower end of the B1 pixels, and the lower end of the lower-side opening portion 51A-2 is located below the lower end of the B3 pixels by an amount for one pixel. Therefore, the image blurring is suppressed in the A3 pixels and the A6 pixels in each of which the image blurring may be generated for the period of time for the transition of <4>→<1>.

Therefore, for the period of time for the transition of <4>→<1>, the peak values of the output voltages detected in the A3 pixels and the A6 pixels are sampled as the effective values of the luminances, respectively.

The sampling of the peak values for each period of time as described above is carried out, whereby for one period in which the state is returned from the state <1> back to the state <1> again, the image for all the pixels in the imager 3 can be obtained while the image blurring is suppressed in the A1, A3, A4, A6, B1, B3, B4, and B6 pixels in each of which the image blurring is generated when the single reciprocating driving is carried out.

Here, as can be seen from the description as well given with reference to FIGS. 17 and 18, for attaining the desire in terms of the third embodiment, the opening portions 51A each having the width for at least three or more pixels are formed in the shielding member 51. Also, it is only necessary to reciprocate the shielding member 51 so as to obtain:

1) a first driving state in which the upper end of the opening portion 51A-1, which is formed in the uppermost portion, of the opening portions 51A is located in the upper end of the effective pixel range of the imager 3;

2) a second driving state in which the lower end of the opening portion 51A-2, which is formed in the lowermost portion, of the opening portions 51A is located in the lower end of the effective pixel range;

3) a third driving state in which the upper end of the opening portion 51A-1 is located in the upper side with respect to the upper end of the effective pixel range; and 4) a fourth driving state in which the lower end of the opening portion 51A-2 is located in the lower side with respect to the lower end of the effective pixel range.

By adopting such processes, the effective values for each of which the blurring is suppressed can be obtained as the values of the luminances of the pixels in each of which the image blurring may be generated for each of the periods of time as shown in FIG. 18. As a result, the values of the output voltages from the pixels at the timings at each of which the image blurring is reduced are sampled, thereby making it possible to obtain the captured image signal for which the image blurring is suppressed.

Note that, as previously stated with reference to FIGS. 15A and 15B, the region in which the image blurring is generated depends on the size of the gap defined between the imager 3 and the shielding member 51. Therefore, an amount by which the shielding member 51 is overrun in terms of the third driving state and the fourth driving state has to be suitably set depending on the size of the gap.

Here, when the technique in the third embodiment described above is adopted, the frame rate (chopper frequency) for the image capturing is set as being at least more than twice the frame rate for the output (in this case, precisely meaning that the period obtained by halving the period of <1>→<1> is set as being more than twice), thereby making it possible to obtain the image for all the effective pixels of the imager 3 within the period of time for one frame on the output side.

In addition, in this case as well, the frame rate for the image capturing is set as being more than four times the frame rate for the output. Also, the values each equal to or larger than 2 are obtained as the luminances of the pixels for the period of time for one frame of the output side, and these values are either averaged or integrated, thereby making it possible to increase the sensitivity and to enhance the S/N ratio.

Figure 19:
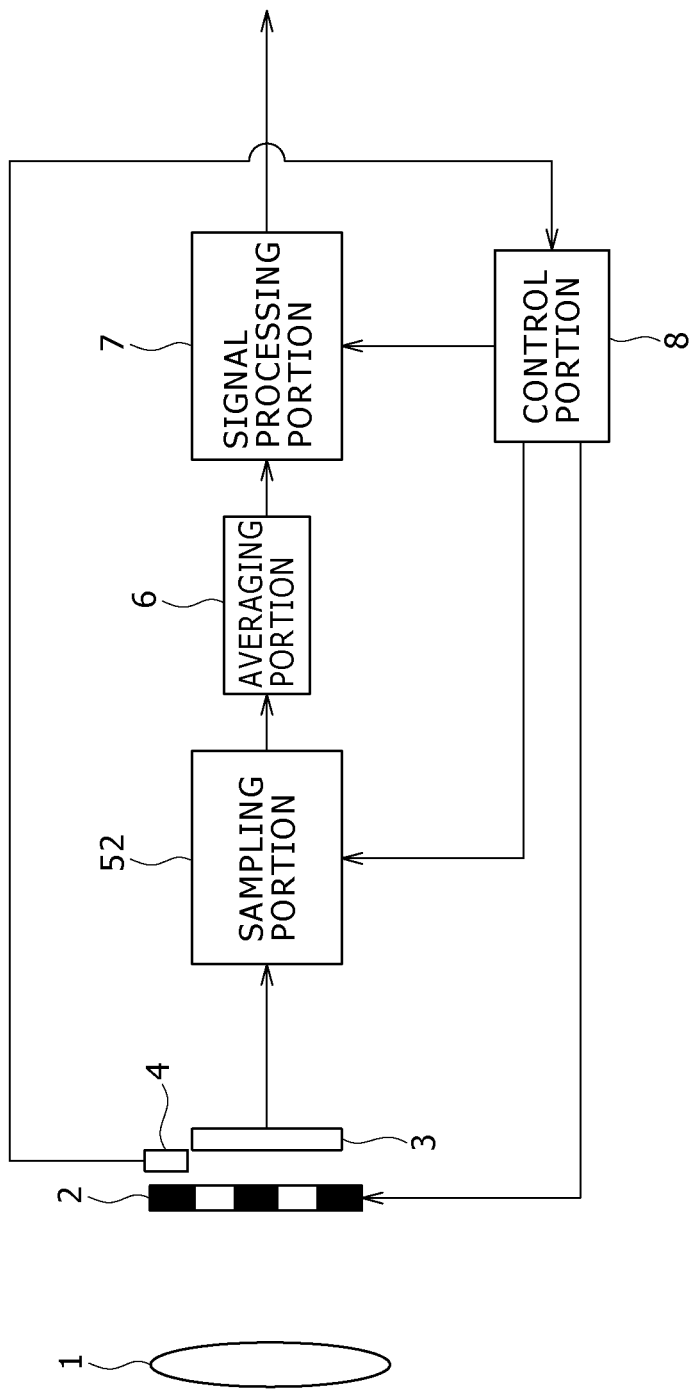
FIG. 19 is a block diagram showing a general internal configuration of the image pickup apparatus according to the third embodiment.

FIG. 19 is a block diagram showing a general internal configuration of the image pickup apparatus as the third embodiment for realizing the image capturing technique as the third embodiment described above.

It is noted that in this case, as an example, the frame rate for the image capturing is set as four times of the frame rate for the output.

As can be understood from comparison with the case of FIG. 6, the image pickup apparatus of the third embodiment is different from the image pickup apparatus of the first embodiment in that a sampling portion 52 is provided instead of providing the sampling portion 5, and a control portion 53 is provided instead of providing the control portion 8.

In addition, the shutter portion 2 in this case is provided with the shielding member 51.

The control portion 53 supplies the drive signal to the shutter portion 2 so as to obtain the first driving state, the second driving state, the third driving state, and the fourth driving state as the driving states of the shielding member 51. Specifically, in this case, the control portion 53 supplies the drive signal to the shutter portion 2 so as to repetitively obtain the driving states based on the states of <1>→<2>→<3>→<4>→<1> previously stated with reference to FIG. 17.

In addition, the control portion 53 instructs the sampling portion 52 to set the sampling timings for the pixels. Specifically, the control portion 53 instructs the sampling portion 52 to set the sampling timing for each row. As can be understood from the description as well previously given with reference to FIG. 18, since the sampling timing for each row is naturally determined if the technique for driving the shielding member 51 is decided, the data on the sampling timings can be preset in the control portion 53 depending on the technique for driving the shielding member 51.

It is noted that the control portion 53 carries out the control for causing the signal processing portion 7 to execute temperature adjustment processing for the image corresponding to the temperature value obtained from the temperature sensor 4 similarly to the case of the control portion 8 previously stated.

The sampling portion 52 detects the peak values (the positive peak values in this case) of the pixels similarly to the case of the sampling portion 5. However, the sampling portion 52 is different from the sampling portion 5 in that the sampling portion 52 is configured in such a way that of the peak values detected, the peak values of the output voltages from the pixels in each of the rows are outputted at the timing which is instructed every row from the control portion 53.

4. Fourth Embodiment (Variable Reciprocating Range: Suppression of Output Difference in Phase of Driving Direction Reverse)

In the fourth embodiment, differences of the output voltages between the pixels in which the opening portion is located, and other pixels which are generated when the driving direction of the shielding member is reversed are suppressed.

Figure 20A:
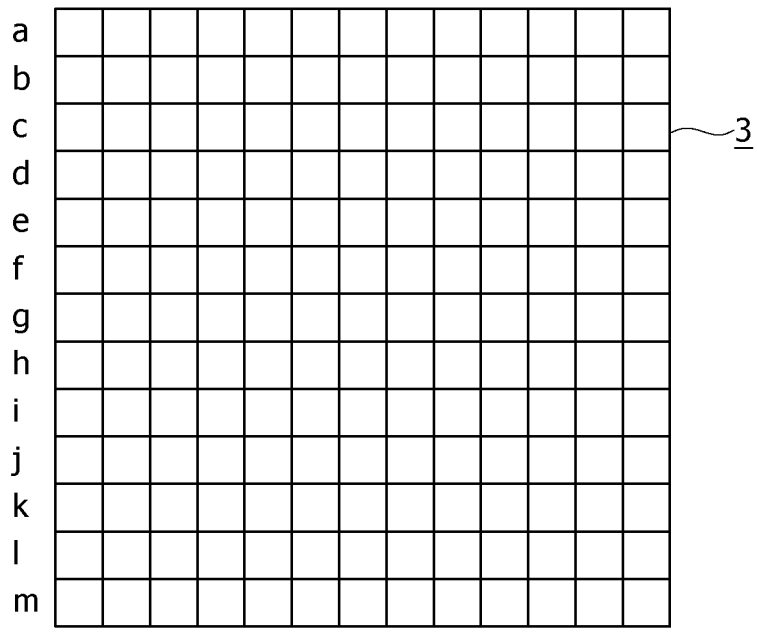
FIGS. 20A and 20B are top plan views showing schematic structures of an imager and a shielding member which an image pickup apparatus according to a fourth embodiment includes, respectively.
Figure 20B:
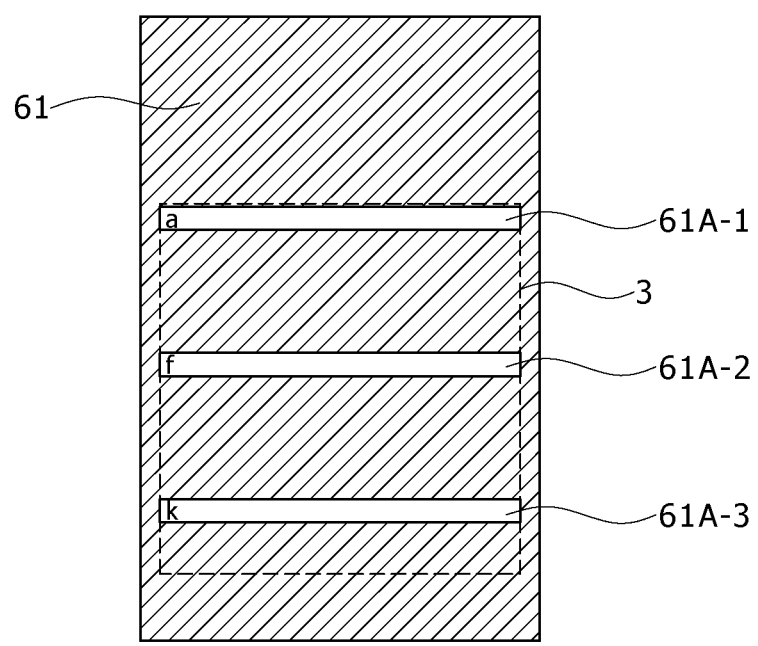

FIGS. 20A and 20B are top plan views of the imager 3 and a shielding member 61 which an image pickup apparatus of the fourth embodiment includes, respectively.

As shown in FIG. 20A, for the sake of convenience of a description, it is supposed that the 169 (=13×13) pixels are formed in the imager 3. Therefore, as shown in FIG. 20A, 13 rows from a to m are formed in the imager 3 in this case.

Also, with regard to the shielding member 61 which the shutter portion 2 in this case includes, each adjacent two of three opening portions 61A each having a width for one row of the pixels are formed so as to face each other across a portion which is not the opening portion 61A and which has a width for four rows of the pixels. Thus, the three opening portions 61A are formed in the shielding member 61 in such a manner.

As shown in FIG. 20B, the opening portion 61A formed on the uppermost side is taken to be a first opening portion 61A-1, the opening portion 61A formed on the lower side of the first opening portion 61A-1 is taken to be a second opening portion 61A-2, and the opening portion 61A formed on the lowermost side is taken to be a third opening portion 61A-3.

FIG. 20B shows a state in which the first opening portion 61A-1 is located on the pixels (a pixels) which are formed in the uppermost portion of the imager 3. A relationship between positions (each indicated by [ ]) where the opening portions 61A are formed, respectively, and the rows from a to m of the imager 3 in this case is expressed as follows:

[a]bcde[f]ghij[k]lm

It is noted that as can be understood from this relationship as well, the opening portions 61A in this case can also be expressed in such a way that the opening portions 61A are formed every five rows.

Here, when the structure that the multiple opening portions each having the width for one row of the pixels are provided in the shielding member and the interval having the width for multiple rows of the pixels is defined between each adjacent two opening portions is adopted as with the fourth embodiment, the output differences are generated between the pixels in which the opening portions are located when the driving direction of the shielding member is reversed, and the pixels other than these pixels due to that a time length required during passing of the shielding member is different between the pixels in which the opening portions are located when the driving direction of the shielding member is reversed, and the pixels other than these pixels.

FIGS. 21A and 21B are views explaining this respect.

A graph shown in FIG. 21A represents a locus of the drive position of the opening portion 61A when the shielding member 61 is reciprocated in accordance with a drive signal having a sine wave.

In addition, FIG. 21B represents transition of the luminances of the pixels of the rows from a to m in sections 1 to 18 when one period (chopper frequency) of the drive signal for the shielding member 61 is divided into the 18 sections. It is noted that the luminance in this case is expressed in four steps. That is to say, black represents the lowest luminance, deep gray represents the low luminance, light gray represents a middle luminance, and white represents the high luminance.

Here, FIGS. 21A and 21B show an example when the shielding member 61 is reciprocated for six pixels.

Note that, the reason that the shielding member 61 is not reciprocated for five pixels (in a word, the shielding member 61 is not reciprocated between the opening portion formation positions) is based on consideration of the possibility that when the drive distance of the shielding member 61 is long, it is difficult to precisely control the reverse position of the shielding member 61.

Firstly, as can be seen with reference to FIG. 21A, when the shielding member 61 is reciprocated, a time required for the opening portion 61A to move for one row becomes relatively long in the vicinity of each of the upper and lower reverse positions. Specifically, in this case, a time length for which the opening portion 61A sets the pixels in each of the upper and lower reverse positions in the radiation state reaches a time length for four sections (a time length for two sections in outward+a time length for two sections in return). On the other hand, with regard to the portion which is not located in the vicinity of each of the reverse positions, a time length required for a movement for one row is short, and becomes a time length for about one section.

Such a difference in the movement speed of the opening portion 61A corresponds to the difference in the chopper frequency. Therefore, the difference in the sensitivity is generated between the pixels located in the vicinity of each of the upper and lower reverse positions, and the pixels other than those pixels (refer to FIGS. 5A and 5B). Specifically, when the frequency of the drive signal is about 120 Hz in this case, the chopper frequency for the pixels other than the pixels located in the vicinity of each of the upper and lower reverse positions becomes about 120 Hz, whereas the chopper frequency for the pixels located in the vicinity of each of the upper and lower reverse positions becomes about 30 Hz. This results in the difference between "the pixel in the reverse position=about 18 μV" and "the pixel other than the pixel in the reverse position=about 27 μV" in terms of the difference in the sensitivity shown in FIG. 5A.

In addition, there is caused a problem that when the integration is desired to be carried out with a view to enhance the sensitivity and the S/N ratio, a difference is generated in the number of times of accumulation of the peak values (positive peak values).

For example, when the f pixels and the i pixels in FIG. 21B are compared with each other, with regard to the number of times of detection of the peak values within one period corresponding to the sectors 1 to 18, the f pixels have the three peak values in total of "the peak value in the reverse position=once (section 17)+the peak value in the non-reverse position=twice (section 7 and section 12)." On the other hand, the i pixels have the two peak values in total of "the peak value in the non-reverse position=twice (section 5 and section 14)."

Therefore, for example, not only the output difference due to the difference in the chopper frequency described above, but also the output difference due to the difference in the number of times of the accumulation are generated between the f pixels and the i pixels.

Note that, since FIG. 21B exemplifies the case where the driving for six pixels is carried out, the difference is generated in the number of times of the accumulation of the peak values as described above. However, when the driving for the five pixels is carried out, with regard to the number of times of the detection of the peak values within one period, the f pixels have "the peak value in the reverse position=twice," and the i pixels have also "the peak value in the non-reverse position=twice." Thus, the number of times of the detection of the peak values within one period in the f pixels is identical to that in the i pixels.

However, in this case, it goes without saying that although there is no difference in the number of times of the accumulation, the output difference due to the chopper frequency as described above is generated.

Here, such an output difference which may be generated every row can be calibrated to some degree by carrying out the temperature correction in a phase of the shipping. It is noted that the temperature correction stated herein means that the electromagnetic wave is radiated with the uniform luminance to carry out the image capturing, and the gain adjustment (the giving of the correction coefficient) is carried out for the pixels so that the output voltages from the pixels obtained in this case becomes uniform.

However, when the original output difference is large, there is no guarantee that the output differences can be perfectly calibrated by carrying out the temperature correction in the phase of the shipping.

For this reason, in the fourth embodiment, the measures are taken to cope with this situation by devising the technique for driving the shielding member 61.

Figure 22:
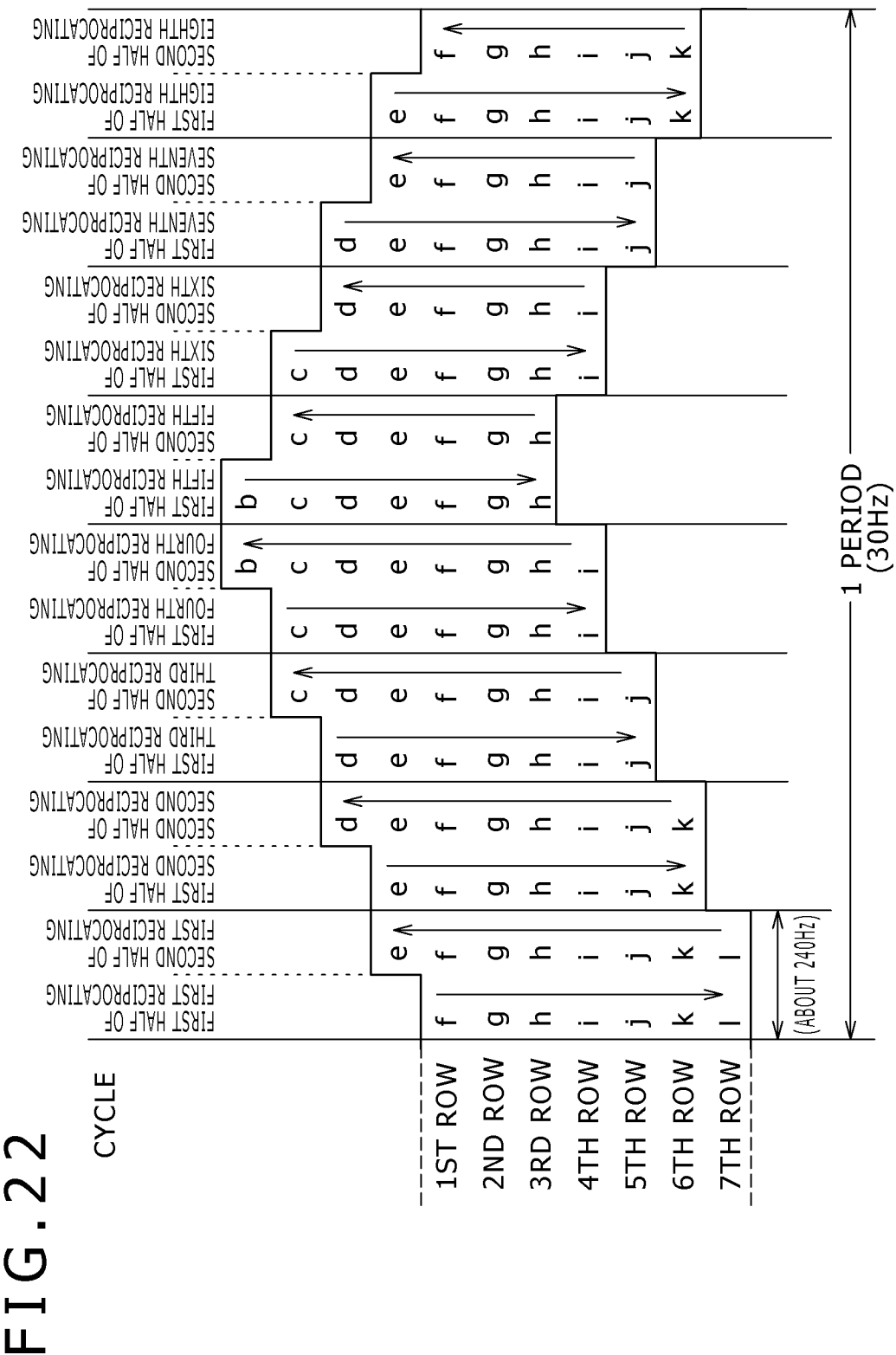
FIG. 22 is a diagram explaining a driving technique for the shielding member in the image pickup apparatus of the fourth embodiment.

FIG. 22 is a diagram explaining the technique for driving the shielding member 61 in the fourth embodiment.

It is noted that for the sake of convenience of an illustration, FIG. 22 shows only a locus of a movement of the second opening portion 61A-2 of the three opening portions 61A-1, 61A-2 and 61A-3 which are formed in the shielding member 61.

As can be seen with reference to FIG. 22, in the fourth embodiment, the shielding member 61 is driven in such a way that the locus in the range (the range surrounded by a thick frame in FIG. 22) within which the second opening portion 61A-2 is reciprocated makes one reciprocating motion in the vertical direction with a certain period.

In other words, the shielding member 61 is driven in such a way that the upper and lower reverse positions of the shielding member 61 are gradually shifted with the period corresponding to one reciprocating motion of the shielding member 61, and the upper and lower reverse positions of the shielding member 61 are returned back to the original positions, respectively, when the predetermined number of times of the reciprocating motions is reached.

Specifically, in this case, the shift of the reverse position is carried out in such a way that after the shift to the upper side is carried out, the shift is switched over to the shift to the lower side, whereby the locus of the reciprocating range of the opening portion 61A is protruded to the upper side as shown in FIG. 22.

At this time, an amount of shift of the reverse position in the period of one reciprocating motion of the shielding member 61 is set one pixel by one pixel as shown in FIG. 22.

Also, in this case, an amount of initial drive for the shielding member 61 (an amount of initial outward drive: referred to as "an amount of reference drive" as well) is set as an amount of drive for six pixels.

In addition, a maximum shift amount of the reverse position is set as an amount for four pixels.

In this case, "the number of times of the reciprocating motion of the shielding member 61=8 times" is obtained by these setting, and thus the upper and lower reverse positions are returned back to the original positions, respectively. In other words, one vertical reciprocating of the reverse position (the vertical one reciprocating in the reciprocating range of the opening portion 61A) is carried out with the period of the eight reciprocating motions of the shielding member 61 as one period.

Figure 23:
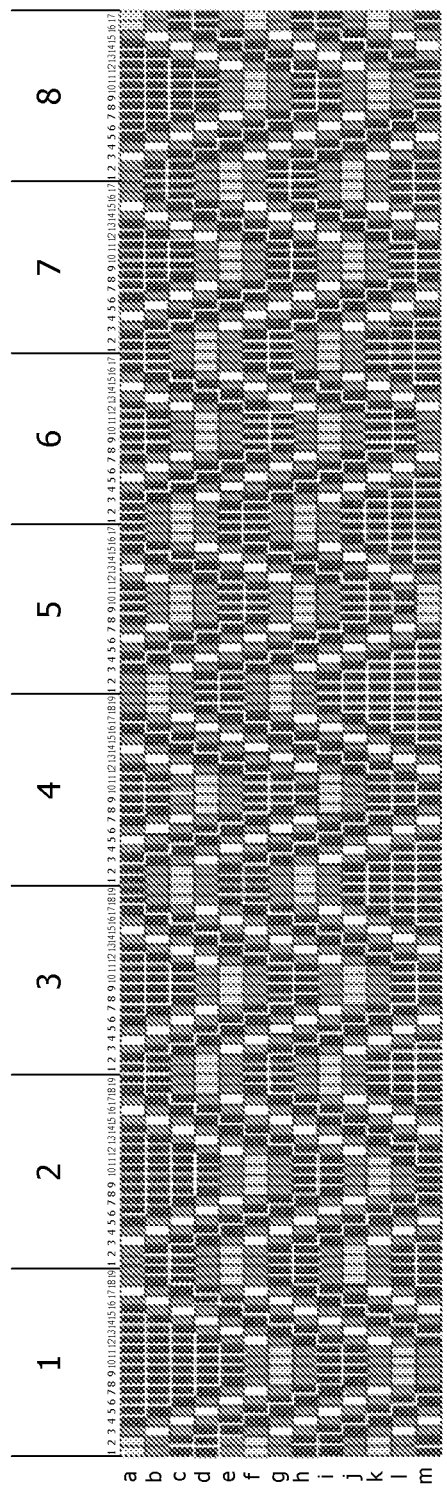
FIG. 23 is a view schematically showing a change of a luminance of each pixel following a lapse of time when the shielding member in the image pickup apparatus of the fourth embodiment is driven in accordance with the driving technique.

FIG. 23 schematically shows changes of the luminances of the pixels following a lapse of time in the case where the shielding member 61 is driven by using the driving technique in the fourth embodiment.

Numerical values of 1 to 8 shown in the uppermost portion in FIG. 23 represent the number of times of the reciprocating motion of the shielding member 61.

In addition, in FIG. 23 as well, black represents the lowest luminance, deep gray represents the low luminance, light gray represents the middle luminance, and white represents the high luminance.

As can be understood with reference to FIG. 23, according to the driving method in the fourth embodiment, when the period with which the shielding member 61 makes the eight reciprocating motions is set as one unit period, it is understood that the luminance distribution approximately, uniformly spreads over all the pixels with the one unit period.

In the fourth embodiment, there is adopted a technique that after the luminance distribution is made to approximately, uniformly spread over all the pixels with one unit period in such a manner by using the driving technique described above, the peak values (positive peak values) detected from each of the pixels are integrated and outputted.

In a word, the output difference for each row generated when the reciprocating motions for six pixels (or the reciprocating motions for five pixels) are simply carried out is suppressed by adopting that technique.

Here, it can be understood from FIG. 23 that in this case, the luminance especially, uniformly spread over the range of the d pixels to the j pixels.

Specifically, when the number of times of the detection of the peak values of the output voltages from these pixels within one unit period is checked by the luminance, i.e., the high luminance (white), the middle luminance (light gray), and the low luminance (deep gray), the following results are obtained.

|  | High luminance | Middle luminance | Low luminance | Total |
|---|---|---|---|---|
| d pixel | 16 times | 4 times | 3 times | 23 times |
| e pixel | 16 times | 4 times | 3 times | 23 times |
| f pixel | 16 times | 3 times | 3 times | 22 times |
| g pixel | 16 times | 2 times | 4 times | 22 times |
| h pixel | 16 times | 3 times | 3 times | 22 times |
| i pixel | 16 times | 4 times | 3 times | 23 times |
| j pixel | 16 times | 4 times | 3 times | 22 times |

On the other hand, the number of times of the detection of the peak values of the output voltages from the same pixels when the reciprocating motions for the six pixels are simply carried out is as follows.

|  | High luminance | Middle luminance | Low luminance | Total |
|---|---|---|---|---|
| d pixel | 16 times | 0 times | 0 times | 16 times |
| e pixel | 16 times | 0 times | 8 times | 24 times |
| f pixel | 16 times | 8 times | 0 times | 24 times |
| g pixel | 16 times | 8 times | 0 times | 24 times |
| h pixel | 16 times | 0 times | 8 times | 24 times |
| i pixel | 16 times | 0 times | 0 times | 16 times |
| j pixel | 16 times | 0 times | 8 times | 24 times |

Thus, when the number of times of the detection of the peak values of the output voltages from these pixels within one unit period is compared with the number of times of the detection of the peak values of the output voltages from the same pixels when the reciprocating motions for the six pixels are simply carried out, it is understood that the uniformity of the luminance distribution spreading over the pixels is dramatically increased in the fourth embodiment.

In addition, when the simple reciprocating motions for the five pixels are carried out, only the peak value based on "middle luminance" is obtained in the f pixels. Thus, it goes without saying that from the comparison with this case, the uniformity of the luminance is increased in the case of the fourth embodiment.

Here, the uniformity of the luminance distribution is further reduced in the pixels from the a pixels to the c pixels formed on the upper side, and the pixels from the k pixels to the m pixels formed on the lower side than in the pixels from the d pixels to the j pixels formed in the intermediate position. The reason for this, for example, is because for the pixels from the a pixels to the c pixels, there is no opening portion 61A provided on the upper side with respect to the first opening portion 61A-1, and for the pixels from the k pixels to the m pixels, there is no opening portion 61A provided on the lower side with respect to the third opening portion 61A-3.

At this time, the respect to be noticed is that the imager 3 is actually configured so as to have a large number of pixels in order to attain the image resolution based on the VGA (640× 480) or the like. That is to say, in this case, when the structure is adopted such that the opening portion 61A is provided every five rows as with the shielding member 61, almost the pixels becomes the pixels in the intermediate position like the pixels from the d pixels to the j pixels.

Therefore, when none of the output voltages from the pixels of the a pixels to the c pixels on the upper side and the pixels from the k pixels to the m pixels on the lower side is used on the assumption that the a pixels to the c pixels on the upper side and the pixels from the k pixels to the m pixels on the lower side are previously excluded from the effective pixels, the output difference for each pixel can be further improved.

Or, when the opening portions 61A are further provided on the upper side of the first opening portion 61A-1, and the lower side of the third opening portion 61A-3, respectively, in terms of the shielding member 61, with respect to the pixels from the a pixels to the c pixels, and the pixels from the k pixels to the m pixels, the output differences can also be improved similarly to the case of the pixels from the d pixels to the j pixels.

As described above, according to the fourth embodiment, the shielding member 61, as shown in FIG. 17, is driven so as to make one reciprocating motion in the vertical direction with the reciprocating range of the opening portion 61A as one unit period, and the peak values of the output voltages detected from each of the pixels are integrated every one unit period, whereby the output differences in the pixels can be dramatically suppressed as compared with the case where the reciprocating motions for the predetermined pixels are simply carried out.

At this time, in order to allow the image for all the pixels (for all the effective pixels) to be properly obtained, the frequency corresponding to one unit period has to be made to agree with the frequency of the frame rate for the output at the least. In this case, when the frame rate for the output=30 Hz, as shown in FIG. 17, one reciprocating period of the shielding member 61 becomes about 240 Hz (240 Hz in average). According to the graphs shown in FIGS. 5A and 5B, respectively, this one reciprocating period of the shielding member 61 corresponds to the range in which the output of the charge collection is increased, and thus is advantageous in terms of the S/N ratio.

Here, in the fourth embodiment described above, when the state of "[a]bcde[f]ghij[k]lm" shown in FIG. 20B is treated as the reference position of the shielding member 61, the shielding member 61 is downward driven by a movement amount for up to six pixels, and is upward driven by a movement amount for up to four pixels. For this reason, a shielding region on the upper side of the first opening portion 61A-1 in the shielding member 61 has to be provided by a width for at least the six pixels, and a shielding region on the lower side of the third opening portion 61A-3 in the shielding member 61 has to be provided by a width for at least the four pixels.

As can be understood from this as well, in the fourth embodiment, the size of the shielding member can be dramatically reduced as compared with the case of the existing optical chopper 101, and the driving range is also so small as to correspond to the width for up to the six pixels. Therefore, in terms of the fourth embodiment as well, the fact remains that the image pickup apparatus can be miniaturized similarly to the case of the first embodiment previously stated.

Figure 24:
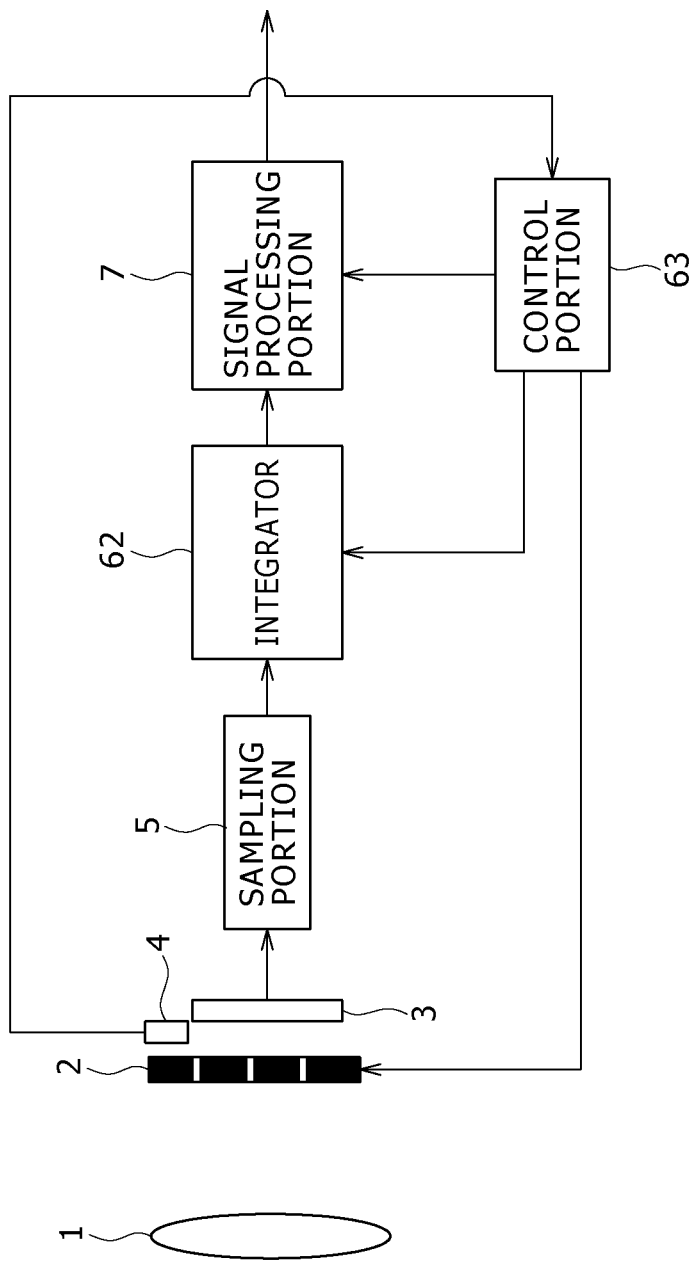
FIG. 24 is a block diagram showing a general internal configuration of the image pickup apparatus according to the fourth embodiment.

FIG. 24 shows a general internal configuration of the image pickup apparatus as the fourth embodiment for realizing the image capturing technique as the fourth embodiment described above.

As can be understood from the comparison with the case of the configuration shown in FIG. 6, the image pickup apparatus of the fourth embodiment is different from the image pickup apparatus of the first embodiment in that an integrator 62 is provided instead of providing the averaging portion 6, and a control portion 63 is provided instead of providing the control portion 8.

In addition, the shutter portion 2 in this case is provided with the shielding member 61.

The control portion 63 supplies the drive signal to the shutter portion 2 in such a way that the shielding member 61 is driven by using the technique described with reference to FIG. 17. Specifically, in the case of the fourth embodiment, the control portion 63 supplies the drive signal to the shutter portion 2 in such a way that the initial movement amount (the initial outward drive amount: referred to as "the reference drive amount" as well) of the shielding member 61 is treated as the downward drive amount for the six pixels, and after the upward shift is carried out one pixel by one pixel, the downward shift is carried out one pixel by one pixel with the maximum shift amount of reverse position of the shielding member 61 being set as an amount for the four pixels.

As a result, the shielding member 61 is driven based on the eight reciprocating motions=one unit period as described above.

It is noted that the control portion 63 carries out the control for causing the signal processing portion 7 to execute the temperature adjustment processing for the image corresponding to the temperature value from the temperature sensor 4 similarly to the case of the control portion 8.

The integrator 62 receives as its inputs the luminance peak values from the pixels which are detected in the sampling portion 5 so as to follow the drive for the shielding member 61 as described above, and integrates these luminance peak values every pixel.

At this time, the integrator 62 carries out the output and the zero-resetting for the integrated values for the pixels at timing for each one unit period instructed from the control portion 63. As a result, the integration and the zero-resetting for the pixels are repetitively carried out every one unit period. In other words, the relationship of "the one unit period=the frame rate for the output" described above is realized.

It should be noted that when none of the output voltages from the pixels (rows) formed in the upper end portion and the lower end portion of the imager 3 is used as described above, it is only necessary to adopt a configuration that either the integrator 62 or the signal processing portion 7 carries out the output only with respect to the pixels within the effective pixel range.

It is noted that the averaging can also be carried out instead of carrying out the integration. In this case, an averaging portion has to be configured in such a way that the peak values supplied thereto from the sampling portion 5 every pixel within the one unit period are averaged and outputted so as to correspond to the number of times of the supply of the peak values.

5. Changes

Although the embodiments of the present application have been described so far, the present application should not be limited to the concrete structures and configurations described until now, and thus various structures and configurations may be adopted without departing from the subject matter of the present application.

For example, although in the above description, the case where the shielding member which the shutter portion 2 includes is caused to make the vertically reciprocating motion is exemplified, of course, the shielding member can also be caused to make the horizontally reciprocating motion. In the case where the shielding member is caused to make the horizontally reciprocating motion, it goes without saying that when the stripe-like openings are provided as with the second example or the fourth example of the first embodiment, the stripe-like openings are not arranged in the row direction, but are arranged in the column direction. In addition, when the reciprocating range of the shielding member is shifted as with each of the third and fourth embodiments, it also goes without saying that the vertical direction of the shift described above is replaced with the horizontal direction for the shift.

In addition, with regard to the third example of the first embodiment, the shielding member 34 is not driven in the oblique direction from top left to right bottom or from right bottom to top left, but can be driven in the oblique direction from top right to bottom left or from bottom left to top right.

In addition, although in the above description, the case where the shielding member is driven by the VCM, the present application is by no means limited thereto. That is to say, the shielding member can also be driven by an ultrasonic wave motor, a DC motor, an AC motor, a stepping motor, a linear motor, a molecular motor, an electrostatic motor, a piezoelectric element actuator, or a polymer actuator.

Figure 25:
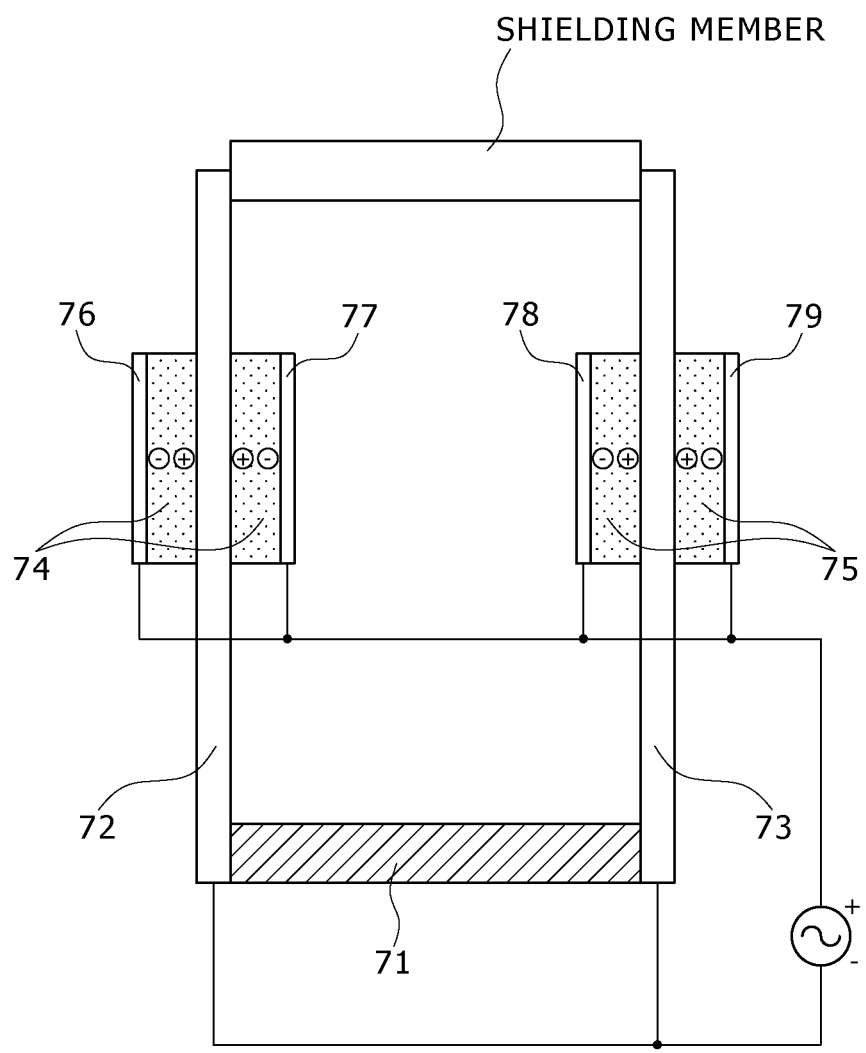
FIG. 25 is a view showing a construction of a shutter portion using a piezoelectric element actuator.

As an example, FIG. 25 shows a construction of the shutter portion using the piezoelectric element actuator. Note that, in FIG. 25, the construction of the shutter portion using the piezoelectric element actuator is shown in the form of a cross sectional view.

In the example shown in FIG. 25, the shielding member 21, 31, 34, 35, 51, 61 is supported by a plate-like flexible member 72 and a plate-like flexible member 73 each having a function as an electrode. Specifically, one end portions of the plate-like flexible members 72 and 73 are fixedly adhered to one side surface and the other side surface of the shielding member, respectively, thereby supporting the shielding member. Also, the other end portions of the flexible members 72 and 73 are fixedly adhered to a substrate 71, respectively, as shown in FIG. 25.

Piezoelectric elements 74 and 74 are fixedly adhered to the flexible member 72 so as to sandwich the flexible member 72 between them. Also, piezoelectric elements 75 and 75 are fixedly adhered to the flexible member 73 so as to sandwich the flexible member 73 between them. As shown in FIG. 25, an electrode 76 is provided on a surface of one piezoelectric elements 74 (a surface of one piezoelectric elements 74 opposite to a surface of one piezoelectric elements 74 fixedly adhered to the flexible member 72). Also, an electrode 77 is provided on a surface of the other piezoelectric element 74. Likewise, an electrode 78 is provided on a surface of one piezoelectric element 75 (a surface of one piezoelectric element 75 opposite to a surface of the one piezoelectric element 75 fixedly adhered to the flexible member 73). Also, an electrode 79 is provided on a surface of the other piezoelectric element 75.

Here, a PZT in a polarization state, or the like is used as each of the piezoelectric elements 74 and 75. The polarization state (+/−) of each of the piezoelectric elements 74 and 75 is set in such a way that a plus direction and a minus direction become common among the piezoelectric elements 74 and 75 as shown in FIG. 25.

Under this condition, for example, as shown in FIG. 25, each of the electrodes 76, 77, 78, and 79 on the surface side is connected to a plus side of a driving voltage source, and each of the flexible members 72 and 73 each having the electrode function is connected to a minus side of the driving voltage source. Under this condition, the piezoelectric elements 74 and 75 are driven.

A drive signal, such as a drive signal having a sine wave, whose plus voltage and minus voltage are repetitively applied with a predetermined period is supplied to the shutter portion constructed in the manner as described above.

Figure 26A:
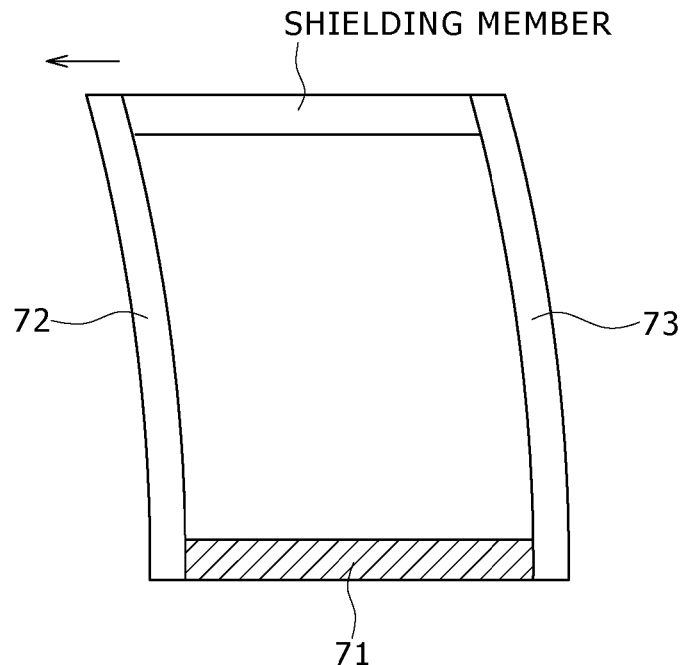
FIGS. 26A and 26B are views showing driving forms of the shielding member by the piezoelectric element actuator, respectively.

According to the polarization state and the form of the connection, the shape of the piezoelectric elements 74 and 75 are changed as the level of the drive signal gradually increases to the plus side. As a result, as shown in FIG. 26A, the flexible members 72 and 73 are gradually bent in the left-hand side direction in the paper, and thus the shielding member is also gradually displaced in the left-hand side direction in the paper.

Figure 26B:
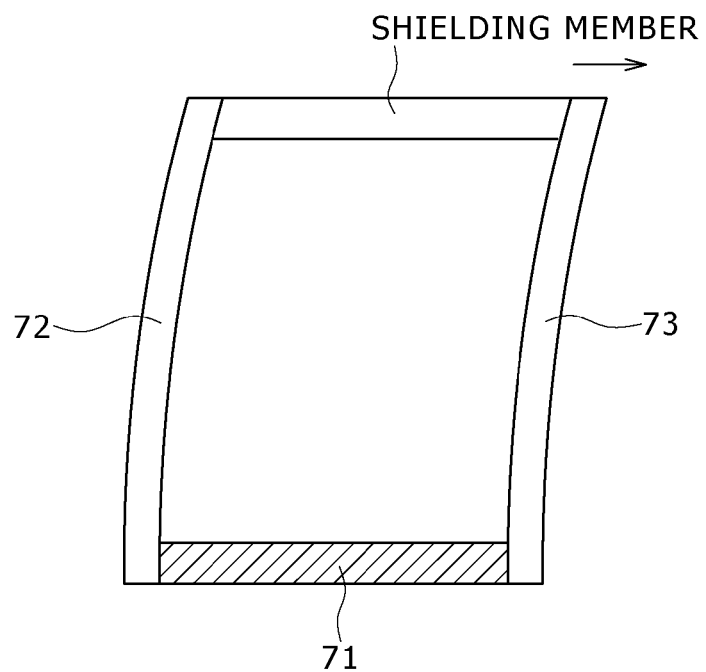
Figure 27:
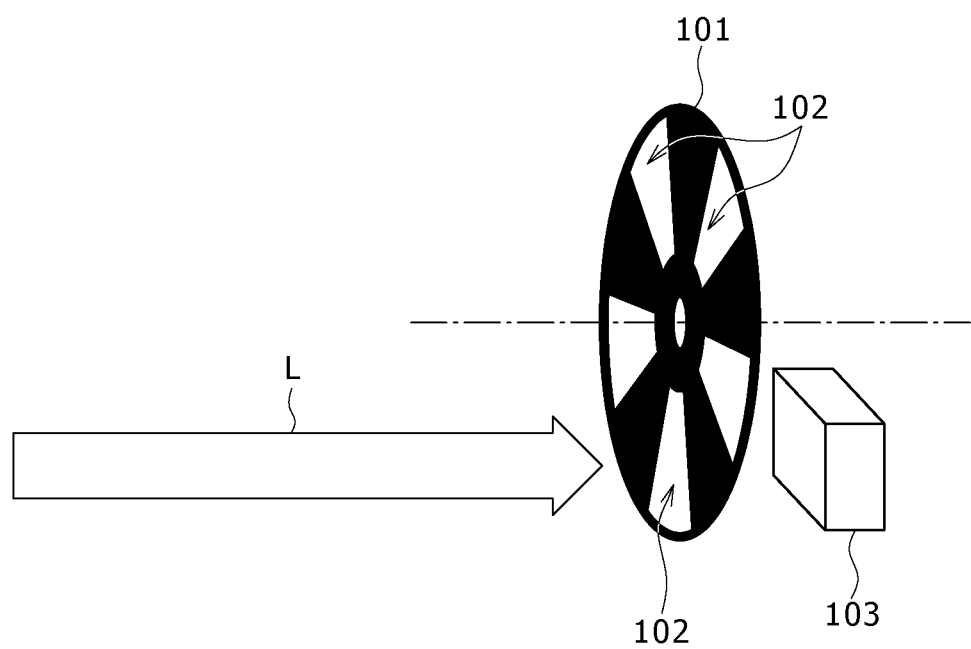
FIG. 27 is a view showing a construction in which an existing optical chopper is provided in an imager composed of a charge collecting element.

Contrary to this, as shown in FIG. 26B, the flexible member 72 and 73 are gradually bent in the right-hand side direction in the paper as the level of the drive signal is gradually reduced. As a result, the shielding member is also gradually displaced in the right-hand side direction in the paper. It is noted that in FIGS. 26A and 26B, for the sake of convenience of the illustration, only the shielding member, the flexible members 72 and 73, and the substrate 71 are extracted and shown.

Even when the shutter portion is composed of the piezoelectric element actuators, the shielding member can be reciprocated. Also, an amount of displacement of the shielding member can be adjusted with the level of the drive signal.

In addition, in the above description, the portion with which the radiation/shielding of the electromagnetic wave for the imager 3 is carried out by mechanically moving the shielding member having the opening portions provided therein is exemplified as the shutter portion 2. However, it is also possible to use an element (opening position variable element), such as a liquid crystal shutter, in which positions of openings through which the electromagnetic wave is radiated to a part of pixels can be arbitrarily set.

For example, when the liquid crystal shutter is used, the positions of the openings can be set by a Digital Signal Processor (DSP), a microcomputer or the like using a program.

It is noted that when the liquid crystal shutter is applied to the image pickup device for detecting the infrared ray as the electromagnetic wave, cover glasses each made of a material which transmits the infrared ray are used as the cover glasses for holding liquid crystal layer between them instead of using normal cover glasses for the liquid crystal which does not transmit the infrared ray. For example, each of the cover glasses is made of a material such as a Si glass, a Ge glass or a BaF2 glass.

In addition, for driving the liquid crystal shutter, electrode films need to be formed on both the surfaces of the glasses, respectively. In this case, a Cr film, a Ti film or the like having a high transmittance in the infrared region can be used as each of the electrode films in the case of the infrared ray instead of using an Indium Tin Oxide (ITO) film in the case of the visible light.

In addition, especially, in the case of the second embodiment, when the shutter portion is composed of the element, such as the liquid crystal shutter, in which the positions of the openings can be arbitrarily set, "the pixels for correction" can be set for a plurality of "selection pixels" so as to have the number of pixels which is at least one or more smaller than the number of "selection pixels."

As a result, the number of selection pixels can be increased as compared with the case where the number of pixels for correction is equal to the number of selection pixels. Therefore, it is possible to enhance the resolution, and it is also possible to obtain the image closer to the real state of the subject.

It is noted that in the present application, a waveform shape of the drive signal in accordance with which the shielding member is reciprocated, or the drive signal in accordance with which the shutter portion such as the liquid crystal shutter should not be limited to a sine wave shape, and thus may also be a trapezoidal shape, or any other suitable shape.

In addition, especially, with regard to the first and second embodiments, the following changes can also be made. That is to say, a configuration is made in such a way that the shielding member is driven to be reversed both in a position where a differential value obtained by differentiating either the luminance average output or the luminance total output from the A pixel 12 becomes zero, and in a position where a differential value obtained by differentiating either the luminance average output or the luminance total output from the B pixel 13 becomes zero.

Or, in the second embodiment, a configuration can also be made in such a way that the shielding member is driven to be reversed in a position where a differential value obtained by differentiating the differential output between the luminance average output or the luminance total output from the A pixel 12, and the luminance average output or the luminance total output from the B pixel 13 becomes zero.

Thus, the shielding member carries out the chopper operation so as to be reversed in the predetermined position. As a result, even when the sensor for servo for detecting the position of the shielding member is not added, it is possible to inexpensively carry out the reverse position control for the shielding member.

It is noted that in this case, the luminance average output or the luminance total output from the A pixel 12, and the luminance average output or the luminance total output from the B pixel 13 may be obtained for all the A pixels 12 and all the B pixels 13, respectively, or for a part of the A pixels 12 and a part of the B pixels 13, respectively.

In addition, especially in the second embodiment, when the width of the opening portion of the shielding member is set as three or more rows (or three or more columns), the A pixel 12 and the B pixel 13 are not necessarily located in the positions adjacent to each other (because there is the A pixel 12 surrounded by the same A pixels 12). Therefore, the actual output voltage from the A pixel 12 and the B pixel 13 closest to each other are compared with each other.

In addition, in the above description, the image pickup element using the charge collecting element is exemplified as the imager 3 or 33. However, the image pickup element which the image pickup apparatus of the present application includes can be composed of the charge collecting element, a ferroelectric element, a micro-bolometer, a meta-material, an antenna element, a Charge Coupled Device (CCD), a Complementary Metal Oxide Semiconductor (CMOS) or the like.

It should be noted that the image pickup apparatus of the present application can be applied to a camera or various apparatuses each utilizing a camera.

A millimeter-wave image pickup camera using a region on a short wavelength side having a wavelength shorter than 10 mm of the millimeter wave, a teraheltz-wave image pickup camera, a thermography camera, a gas detection camera, a visible light camera, an X-ray camera or the like is especially given as the camera.

In addition, a user interface input apparatus, a night travelling vision auxiliary apparatus (night vision), a security gizmo, a health care apparatus, a temperature difference cipher transmitting apparatus, and the like are given as various apparatuses each using the camera.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. An image pickup apparatus, comprising:
   an image pickup element having a plurality of pixels; and
   a radiation/shielding portion configured to radiate/shield an electromagnetic wave for said image pickup element in such a way that a partial pixel selective radiation state in which the electromagnetic wave is radiated to a part of said pixels in said image pickup element and the electromagnetic wave is shielded for the pixels other than the part of said pixels is obtained in a time division manner while the part of said pixels to each of which the electromagnetic wave is radiated is successively changed, wherein said radiation/shielding portion carries out the radiation/shielding of the electromagnetic wave for said image pickup element by reciprocating a shielding member having opening portions formed therein; and
   an image signal acquiring portion configured to acquire values of luminances obtained from the pixels each held in a radiation state of the electromagnetic wave by said radiation/shielding portion in a time division manner, and obtain a captured image signal for one frame based on the values thus acquired, wherein said plurality of pixels in said image pickup element are classified into at least two kinds of first pixels and second pixels; and
   said image signal acquiring portion calculates differences between peak values of luminances from said first pixels and peak values of luminances from said second pixels when each of said first pixels is set in the radiation state and each of said second pixels is set in the shielding state by said radiation/shielding portion as first difference values, calculates differences between peak values of luminances from said first pixels and peak values of luminances from said second pixels when each of said first pixels is set in the shielding state and each of said second pixels is set in the radiation state by said radiation/shielding portion as second difference values, and obtains the captured image signal for one frame based on the first difference values and the second difference values.

2. The image pickup apparatus according to claim 1, wherein said plurality of pixels in said image pickup element are classified into at least two kinds of first pixels and second pixels; and
   said image signal acquiring portion acquires peak values of luminances from said first pixels obtained in accordance with that each of said first pixels is set in the radiation state by said radiation/shielding portion, and peak values of luminances from said second pixels obtained in accordance with that each of said second pixels is set in the radiation state by said radiation/shielding portion, and obtains the captured image signal for one frame based on the peak values acquired from said first and second pixels.

3. The image pickup apparatus according to claim 1, wherein said image signal acquiring portion obtains the difference value every two pixels disposed adjacent to each other.

4. The image pickup apparatus according to claim 1, wherein said image signal acquiring portion carries out medium value complementation from the pixels each held in the radiation state and disposed in a circumference of the pixel held in the shielding state, thereby obtaining the captured image signal.

5. The image pickup apparatus according to claim 1, wherein said opening portions are formed in said shielding member so as to be adapted to selectively radiate the electromagnetic wave to a part of rows or columns of said image pickup element in association with the reciprocating motion; and
   said radiation/shielding portion carries out the radiation/shielding of the electromagnetic wave for said image pickup element while a range in which said shielding member is reciprocated is successively changed.

6. The image pickup apparatus according to claim 5, wherein said radiation/shielding portion reciprocates said shielding member so as to obtain:

a first driving state in which an upper end or a right-hand side end of a first opening portion formed in an uppermost portion or a rightmost portion of said opening portions in said shielding member is located in an upper end or a right-hand side end of an effective pixel range of said image pickup element;

a second driving state in which a lower end or a left-hand side end of a second opening portion formed in a lowermost portion or a leftmost portion of said opening portions is located in a lower end or a left-hand side end of the effective pixel range;

a third driving state in which the upper end or right-hand side end of said first opening portion is located on an upper side with respect to the upper end of the effective pixel range, or on a right-hand side with respect to the right-hand side end of the effective pixel range; and a fourth driving state in which the lower end or left-hand side end of said second opening portion is located on a lower side with respect to the lower end of the effective pixel range or on a left-hand side with respect to the left-hand side end of the effective pixel range.

7. The image pickup apparatus according to claim 5, wherein said radiation/shielding portion reciprocates said shielding member so as to make one reciprocation in a vertical direction or in a horizontal direction over a reciprocating range of said shielding member every predetermined period of time; and said image pickup apparatus further comprises an image signal acquiring portion configured to integrate or average values of luminances from the pixels, and obtain a captured image signal for one frame based on the values of the luminances thus integrated or averaged from the pixels every predetermined period of time.

8. The image pickup apparatus according to claim 1, wherein a driving portion configured to reciprocate said shielding member is composed of an ultrasonic wave motor, a DC motor, an AC motor, a stepping motor, a linear motor, a voice coil motor, a molecular motor, an electrostatic motor, a piezoelectric element actuator, or a polymer actuator.

9. The image pickup apparatus according to claim 1, wherein said radiation/shielding portion carries out the radiation/shielding of the electromagnetic wave for said image pickup element by using an opening position variable element structured so as to be adapted to arbitrarily change positions of openings for radiation of the electromagnetic wave.

10. The image pickup apparatus according to claim 9, wherein said opening position variable element is composed of a liquid crystal element.

11. The image pickup apparatus according to claim 1, wherein said image pickup element is composed of a charge collecting element, a ferroelectric element, a micro-bolometer, a meta-material, an antenna element, a Charge Coupled Device, or a Complementary Metal Oxide Semiconductor.

12. The image pickup apparatus according to claim 1, wherein said opening portions and portions which are not said opening portions of said shielding member are alternately disposed in a checker-like pattern.

13. The image pickup apparatus according to claim 1, wherein said opening portions and said portions which are not said opening portions of said shielding member are alternately disposed every width for two or more rows, up to a half of all pixel rows, or every width for two or more columns, up to a half of all pixel columns.

14. The image pickup apparatus according to claim 1, wherein a reverse position of a differential value of a luminance average output or a luminance total output from the pixels to each of which the electromagnetic wave is radiated, and a reverse position of a differential value of a luminance average output or a luminance total output from the pixels for each of which the electromagnetic wave is shielded are detected, thereby controlling a reverse position of the drive for said shielding member.

15. The image pickup apparatus according to claim 1, wherein a frame rate for an output is taken to be F Hz and a frame rate for image capturing is taken to be n×F Hz, where n is an integral number of 2 or more, and luminances obtained by carrying out image capturing by n times are integrated or averaged, thereby outputting a captured image signal for one frame.

* * * * *